US008547967B2

(12) United States Patent
Grabelsky et al.

(10) Patent No.: US 8,547,967 B2
(45) Date of Patent: *Oct. 1, 2013

(54) METHOD AND APPARATUS FOR PSTN-BASED IP ACTIVE CALL RECOVERY AND RE-ROUTING

(75) Inventors: David A. Grabelsky, Skokie, IL (US); Michael Homeier, Lake Forest, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/165,535

(22) Filed: Jun. 21, 2011

(65) Prior Publication Data

US 2011/0273979 A1    Nov. 10, 2011

Related U.S. Application Data

(62) Division of application No. 12/565,017, filed on Sep. 23, 2009, now Pat. No. 7,990,955.

(51) Int. Cl.
*H04L 12/66* (2006.01)
(52) U.S. Cl.
USPC .......................................... 370/352; 370/353
(58) Field of Classification Search
None
See application file for complete search history.

(56) References Cited

U.S. PATENT DOCUMENTS

| 6,389,005 | B1 | 5/2002 | Cruickshank |
| 6,665,293 | B2 | 12/2003 | Thornton |
| 6,956,816 | B1 | 10/2005 | Alexander et al. |
| 7,016,343 | B1 | 3/2006 | Mermel |
| 7,120,122 | B1 | 10/2006 | Starr et al. |
| 2004/0085894 | A1 | 5/2004 | Wang |

*Primary Examiner* — Creighton Smith

(57) ABSTRACT

A method for rerouting IP (Internet Protocol) telephony call information includes, during an active IP telephony call made by a first IP telephony phone for originating IP telephony calls over an IP network, with a boundary element, actively detecting a network failure condition in the IP network which indicates a switchover to a PSTN (Public Switched Telephone Network) network and generating a failure notification; and with a server for receiving the failure notification, generating a dynamic switchover instruction generated that is sent to the first IP telephony phone, the dynamic switchover instruction initiating automatic switchover of the active IP telephony call to a PSTN network. A method for rerouting IP (Internet Protocol) telephony call information includes, with a server, monitoring an IP network for route failures; and with the server, generating a switchover instruction when an active IP telephony call is interrupted by a route failure. The switchover instruction initiates automatic switchover of the active IP telephony call to a fallback call routed through a Public Switched Telephone Network (PSTN). The switchover instruction includes information which identifies the fallback call as a replacement for the active IP telephony call.

20 Claims, 13 Drawing Sheets

METHOD AND APPARATUS FOR PSTN-BASED IP ACTIVE CALL RECOVERY AND RE-ROUTING

RELATED APPLICATIONS

The present application is a divisional of and claims the priority under 35 U.S.C. §120 of previous U.S. application Ser. No. 12/565,017, filed Sep. 23, 2009 now U.S. Pat. No. 7,990,955 which, in turn, claims the priority of U.S. Pat. No. 7,613,170, filed Jun. 29, 2004, both of which are incorporated herein by reference in their respective entireties.

These applications describe a method and an apparatus for PSTN based IP active call recovery and rerouting. Among other things, the present specification relates to a method and apparatus for PSTN based IP active call recovery and rerouting in a mixed LAN network, such as a mixed IP-PSTN PBX and Centrex system.

BACKGROUND

The convergence of voice, data and multimedia data traffic on packet networks offers a framework for many new and advanced telecommunication services and features for end users. Such a convergence also offers a possibility of a more efficient, less costly network operation for network owners and network providers. Among the packet technologies currently deployed, IP networks are one of the most versatile and widely accepted. This is true in part because of the breadth of services and applications supported, the relative speed with which new services can be developed, and global pool of expertise that has grown with the success and vast reach of the Internet. Within enterprise and campus office settings, two common models for IP-based voice services have emerged that correspond to counterparts in traditional, TDM-based systems: These two common models are IP-based PBX, and IP-based Centrex.

In both of these IP-based voice services, IP client devices (i.e., end users such as an IP Phone) are communicatively coupled to a Local Area Network ("LAN"). The LAN, in turn, is communicatively coupled to a service provider network. This network provides access to other remote LANs, as well as to the public Internet. In the context of the two models, the LAN could be considered, for example, as a small office with a single network, an enterprise or campus network with several subnets, or anything in between. The service provider network could encompass an IP backbone. Alternatively, the service provider network could be implemented as a wide area network ("WAN").

Both the IP-based PBX and IP-based Centrex models support IP-based telephony, or Voice over IP ("VoIP"), as well as other data and multimedia services between client devices within the LAN, and between LANs, via the WAN. Services in both models may be implemented via a combination of network-based servers and intelligent client devices. The IP network carries both media data, IP-based call control, as well as signaling traffic. Both models also support the interworking of IP-based telephony and legacy, TDM-based telephony.

One difference between the IP-PBX and IP-Centrex models, however, is the location of the network-based services and applications that are hosted. For instance, in an IP-PBX model, a LAN owner will typically own the equipment and the software that supports the network-based services and applications. In such a scenario, a service provider is relied upon primarily for WAN access and bandwidth. In contrast to the typical IP-PBX model, in a typical IP-Centrex model, a service provider deploys both the equipment and the software that supports the network-based services and applications, in addition to providing WAN access and bandwidth.

Typical configurations for IP-based PBX and IP-based Centrex systems normally include an Enterprise PSTN Gateway. Such an Enterprise PSTN Gateway provides connectivity between an internal LAN-based IP telephony system and an external PSTN. This complements the IP-WAN links between mutually remote LAN sites. One primary purpose of providing PSTN connectivity is to support IP telephony sessions or calls between LAN-based IP phones and PSTN-based phones. However, PSTN routing of IP calls may also provide a fallback or backup method of routing new extra-LAN calls in the event of a WAN-LAN link failure. PSTN routing of IP calls may also provide a fallback or backup method of routing new extra-LAN calls in the event that a WAN link, for any reason, becomes unavailable to route new IP calls that would normally cross the LAN-WAN boundary. Such fallback routing of new calls is one common feature in IP LAN-based PBX or Centrex systems.

However, such existing systems have certain limitations. For example, such existing systems fail to describe a method or system for expanding the PSTN gateway routing of new IP LAN-based PBX or Centrex calls to include support for a dynamic switchover to a PSTN gateway route of an active IP WAN-routed call. For example, such a dynamic switchover may be triggered where a WAN link fails while active calls are up. Such a dynamic switchover may also be initiated where active WAN-routed calls need to be preempted by higher-priority WAN traffic between respective LAN sites. There is, therefore, a general need for such a system that uses call-state information stored in IP signaling and call control elements of IP-LAN-PBX or IP-LAN-Centrex systems that host an effected endpoint, together with intelligence in the border or edge network elements between the respective LANs and the inter-connecting WAN, to detect the conditions necessitating switchover. There is also a general need to carry out such PSTN call switchover automatically, and preferably without user intervention.

SUMMARY

According to one aspect of the present specification, a method of re-routing an existing IP telephony session is provided. The method includes the steps of originating an IP telephony session between a first IP client and a second IP client and monitoring a network condition of the IP telephony session. The method also includes interrupting the IP telephony session based in part on the network condition and initiating a re-route of the IP telephony session to a PSTN.

According to another aspect of the present specification, a system for rerouting IP telephony call information is provided. The system includes an existing IP telephony call, the telephony call originating at a first IP telephony phone. A second IP telephony phone receiving the IP telephony call from the first IP phone and a network routing condition, the routing condition causing the IP telephony call to be rerouted. A switchover instruction, the switchover instruction initiating a switchover of the existing IP telephony call to a PSTN.

In yet another aspect of the present specification, an IP telephony system is provided. The IP telephony system includes a first IP telephony device and a second IP telephony device in communication with the first IP telephony device. An IP telephony session taking place between the first and the second IP telephony device and a means for monitoring a parameter of the IP telephony session. A means for interrupting the IP telephony session taking place between the first and the second IP telephony device; and a means for switching over the IP telephony session between the first and the second IP telephony device to a PSTN.

These as well as other aspects and advantages of the present specification will become apparent to those of ordinary skill in the art by reading the following detailed description, with appropriate reference to the accompanying drawings.

BRIEF DESCRIPTION OF THE DRAWINGS

An exemplary example of the present specification is described herein with reference to the drawings, in which.

DETAILED DESCRIPTION

Architectural and Operational Context

In the following description of the various network system arrangements, a preferred call signaling protocol used in the various IP network comprises Session Initiation Protocol (SIP). However, as those of ordinary skill in the art will recognize, other IP-based signaling and control protocols could also be used. For example, H.323 could be used instead of, or in addition to, SIP.

Figure 1:
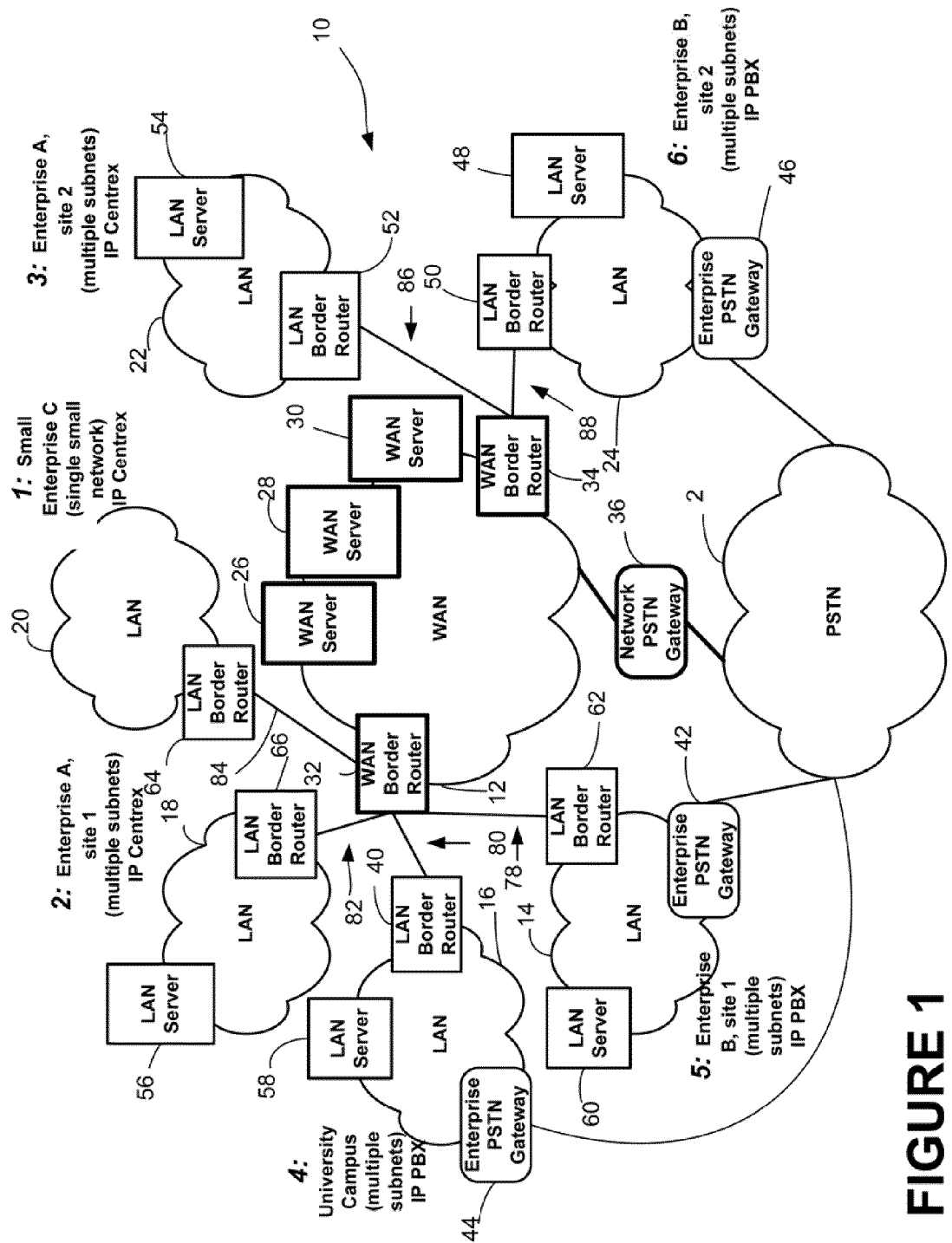
FIG. 1 illustrates a high-level architecture for LAN-WAN and IP-PSTN interconnectivity.

FIG. 1 illustrates a high-level architecture 10 for a LAN-WAN interconnectivity, as well as IP-PSTN inter-working. High-level architecture 10 includes a WAN 12, PSTN 2, and various LANS 14, 16, 18, 20, 22, and 24. In the top-center of FIG. 1, a large "IP cloud" represents WAN 12. In network arrangement 10, WAN 12 comprises two WAN Border Servers 32 and 34, and three WAN Servers 26, 28, and 30.

Six smaller IP clouds 14, 16, 18, 20, 22, and 24 are distributed around WAN 12. These smaller IP clouds can comprise either a PBX based LAN or a Centrex based LAN. These six smaller IP clouds represent six LANs 14, 16, 18, 20, 22, and 24. In the arrangement 10 illustrated in FIG. 1, these six LANs rely on WAN 12 for global IP access. As will be explained in greater detail below, in some cases, these LANs relay on WAN 12 for remote, inter-LAN connectivity. LANs 14, 16, 18, 20, 22, and 24 illustrated in FIG. 1 represent only a first possible arrangement of LAN types that could be part of the overall architecture 10. Therefore, those of ordinary skill in the relevant art will recognize that other alternative arrangements may also be used.

In the bottom-center of FIG. 1, a second large cloud represents Public Switched Telephone Network (PSTN) 2. Both WAN 12 and three of the LANs 14, 16, and 24 are illustrated as being connected to PSTN 2. In addition to the representative clouds in FIG. 1, there are a number of network elements shown as labeled blocks. For example, such labeled blocks include LAN Server 48, LAN Border Router 50, WAN Border Router 34, and WAN server 30. The function of each type of element within the LAN-WAN context is explained in the discussion provided below.

WAN 12 comprises three WAN Servers 26, 28, and 30. Theses three servers 26, 28, and 30 represent various generic server functionalities. Such functionalities could include but are not necessarily limited to such functions as network-hosted services, call signaling, accounting services, and other operations- or business-related applications. WAN 12 also comprises a first and a second WAN Border Router, 32 and 34. WAN Border Routers 32 and 34 provide access for the extra-WAN networks, such as the six LANs 14, 16, 18, 20, 22, and 24 provided in FIG. 1. These network elements, which may also be referred to as border elements, may include such functionality as firewalls, Virtual Private Network ("VPN"), or Application Layer Gateway ("ALG").

In order to support interworking with PSTN 2, WAN 12 includes a Network PSTN Gateway 36. In FIG. 1, Network PSTN Gateway 36 represents a functionality required to interconnect IP-based telephony with PSTN telephony (i.e., interconnecting WAN 12 to PSTN 2). This PSTN Gateway 36 functionality includes media transcoding and signaling translation. Network elements within PSTN 2 have been omitted for the sake of clarity and brevity. However, it should be understood that the number and types of WAN network elements illustrated in FIG. 1 are exemplary, and other network configurations and arrangements are possible. In addition, only those elements that may be relevant to the current system and method described are illustrated. Appropriate details regarding the function of the various network elements will be provided below. Moreover, core network elements, such as routers, are omitted from FIG. 1 for the sake of brevity and clarity as well.

The illustration in FIG. 1 is not intended to limit the number of WAN providers that might make up the global access and interconnectivity of each of the connected LANs. The representation of a single WAN 12 in FIG. 1 could correspond to a single WAN provider for all six LANs 14, 16, 18, 20, 22, and 24. Alternatively, the representation of a single WAN in FIG. 1 could correspond to a plurality of interconnected WAN providers. Moreover, the number of multiple WAN providers could be different for the pairs of interconnected LANs, or for different connections between a given LAN and some service in WAN 12. In the context of the system and method described herein, certain relevant aspects of the LAN-WAN configuration include a number of functions. For example, the LAN-WAN configuration allows the availability of IP interconnections between LANs. In addition, this LAN-WAN configuration allows for an appropriate coordination of signaling elements and border elements at each end of an affected IP session or IP telephony call as will be described in greater detail below. Other functions could be included as well.

LANs 14, 16, 18, 22, and 24 further comprise a "LAN Server." These LAN Servers, similar to WAN 12, represent generic server functionality, such as site-specific or business-specific applications or services. For example, in one arrangement, LAN 14 comprises LAN Server 60, LAN 16 comprises LAN Server 58, and LAN 18 comprises LAN Server 56. Each LAN 14, 16, 18, 20, 22, and 24 further comprise LAN Border Routers. For example, LAN 24 comprises LAN border Router 50, LAN 22 comprises LAN Border Router 52, and LAN 20 comprises LAN Border Router 64. It is these LAN Border Routers that support a LAN-side interface to WAN 12 to thereby establish a WAN-LAN link between the representative LAN and WAN 12. For example, LAN Border Router 40 of LAN 16 supports a LAN-side interface to WAN 12. As with WAN 12, the LAN Border Routers 50, 52, 64, 66, 40, and 62 may include such functionality as firewalls, VPN, or ALG.

The three IP PBX LANs of FIG. 1 further comprise Enterprise PSTN Gateways. For example, LAN 14, LAN 16, and LAN 24, comprise an Enterprise PSTN Gateway 42, 44, and 46, respectively. Enterprise PSTN Gateways 42, 44, and 46 enable LANs 14, 16, and 24 to connect directly to PSTN 2. It should be noted that illustration of the network elements in each LAN as separate blocks is exemplary, and other configurations are possible. For example, additional servers may be present or multiple servers may be implemented on a single hardware platform. Alternatively, the server and border router could be combined into one network entity.

LANs 14, 16, 18, 20, 22, and 24 illustrated in FIG. 1 are numbered one through six. For purposes of illustration, each of the LANs 14, 16, 18, 20, 22, and 24 have been provided with an exemplary, descriptive label. For example, LAN 20 represents a Small Enterprise C, such as, for example, a small enterprise comprising a single IP network (i.e., single subnet). The IP Cloud representing LAN 20 has been outlined with a long-dashed line to visually distinguish this IP Cloud from the other five LANs 14, 16, 18, 22, and 24 provided in FIG. 1. Because LAN 20 does not deploy an Enterprise PSTN Gateway, Small Enterprise C represented by LAN 20 uses IP Centrex. That is, LAN 20 relies on WAN 12 to provide IP telephony services, as well as interworking with PSTN 2. In yet an alternative arrangement, LAN 20 can utilize a separate telephone network where IP telephony is not deployed. That is, LAN 20 might only be used to provide basic data services to Small Enterprise C, while a traditional PBX could be used for telephony services.

Second LAN, LAN 18, and third LAN, LAN 22 represent two sites of a same network entity. In network arrangement 10, LAN 18, and third LAN, LAN 22 represent Enterprise A. The IP Clouds representing LAN 18 and LAN 22 are outlined with a dotted-dashed line to visually pair these IP Clouds together, and to distinguish these IP clouds from the other five LANs 14, 16, 18, and 24 illustrated in FIG. 1. As indicated, each corresponding LAN Cloud represents a site comprising multiple IP subnets. The interconnecting WAN 12 could provide VPN service, allowing the respective LANs (including IP Cloud subnets) to operate as a single, larger, virtual LAN. As with Enterprise A (i.e., LAN 18 and 22), the absence of a PSTN Gateway at either the first site LAN 18 or the second site LAN 22 signifies that these two LANs also utilizes IP Centrex for telephony services as well as for interworking with PSTN 2.

In this exemplary arrangement, the fourth LAN 16 is illustrated as representing a university network and that this university network comprises a plurality of IP subnets. LAN 16 is represented with an IP Cloud that is designated with a short-dashed line to visually distinguish this IP Cloud from the other LANs of FIG. 1. Unlike LAN 18 and 22, LAN 16 comprises an Enterprise PSTN Gateway 44. PSTN Gateway 44 allows LAN 16 to utilize IP PBX for its IP telephony services, including PSTN interworking. WAN 12 provides LAN 16 with WAN access, bandwidth, and perhaps other, WAN-based services besides IP telephony.

Figure 2:
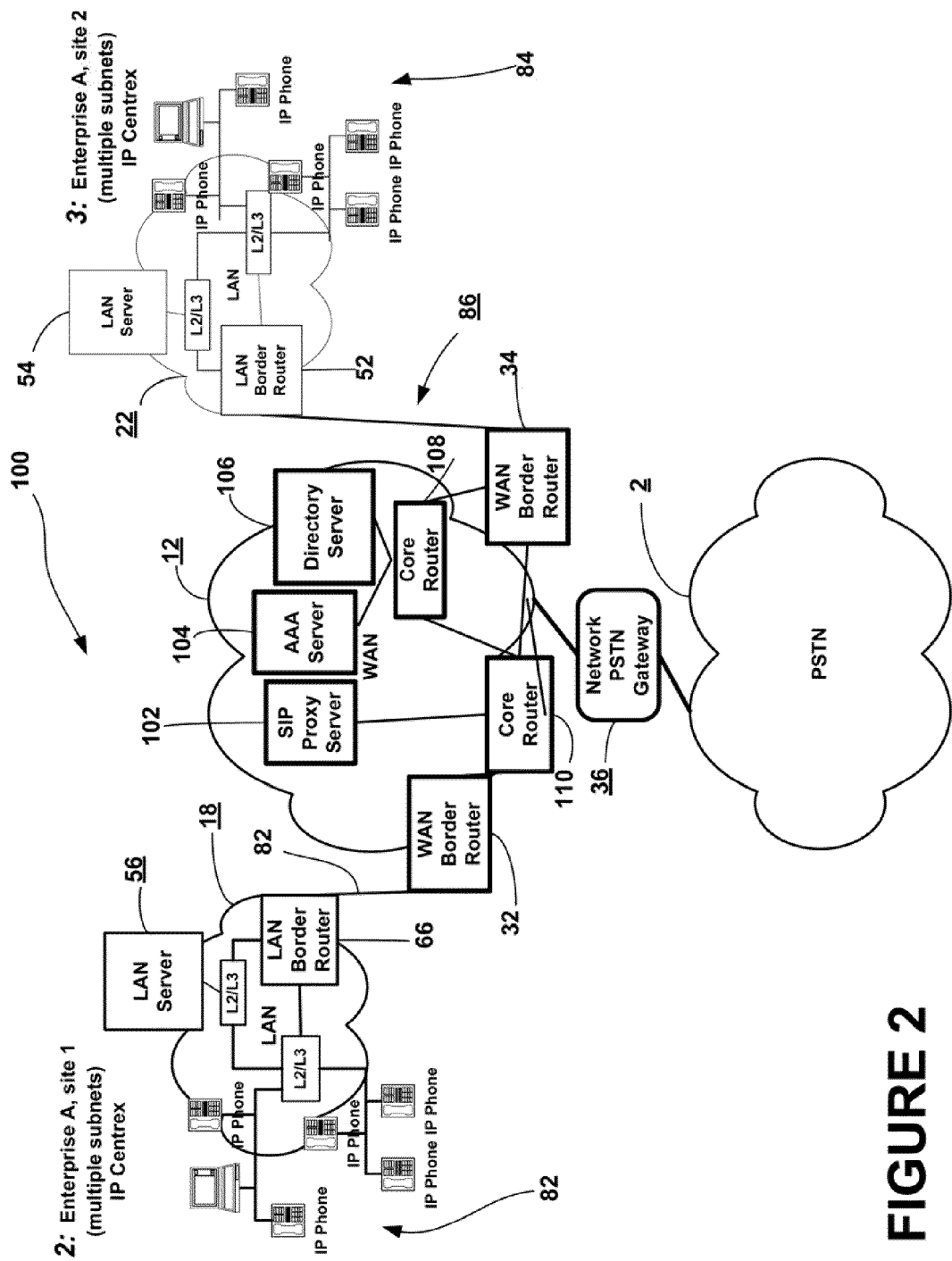
FIG. 2 illustrates one exemplary arrangement of an IP Centrex system based in part on the high-level architecture LAN-WAN and IP-PSTN interconnectivity illustrated in FIG. 1.
Figure 3:
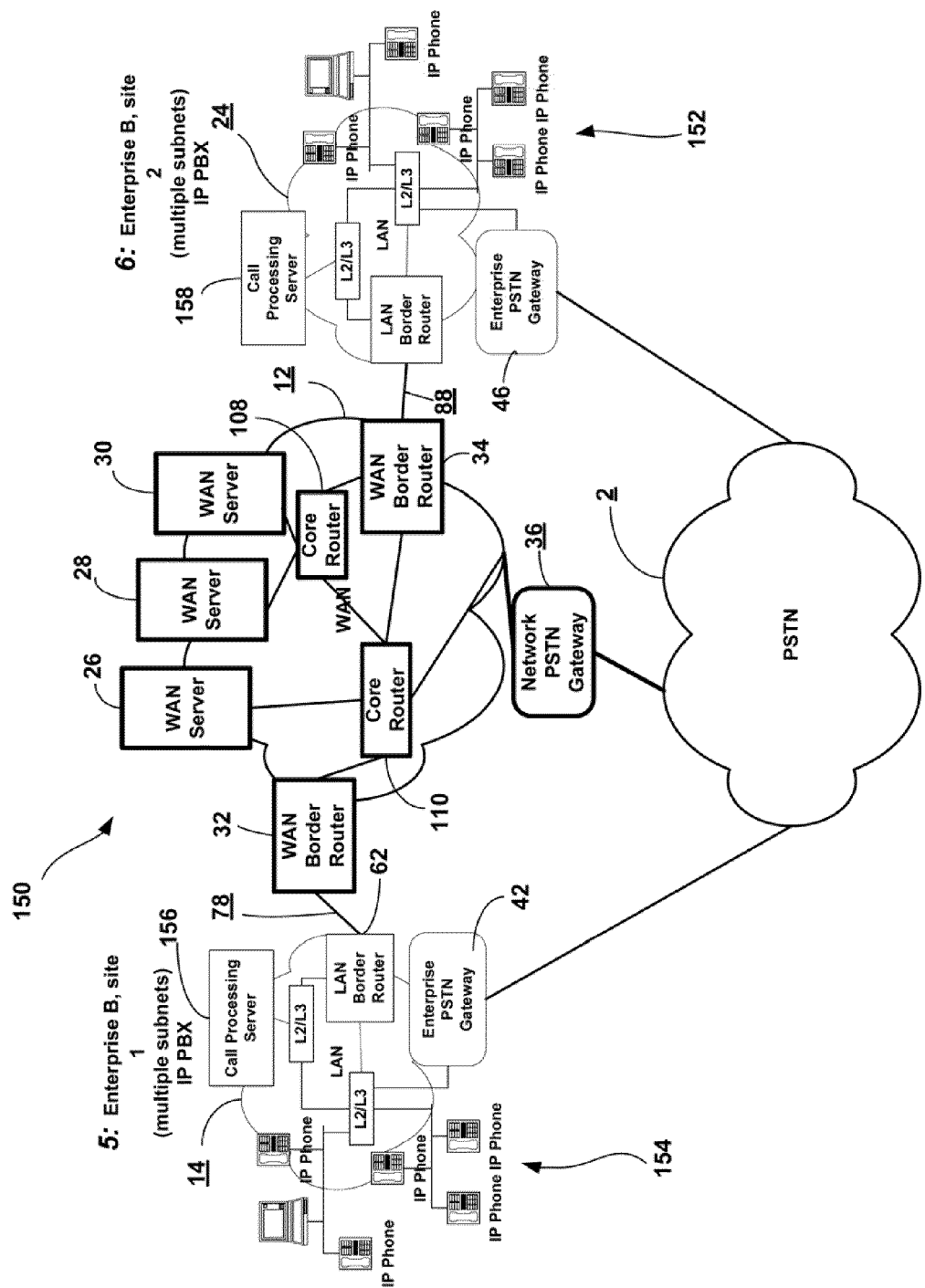
FIG. 3 illustrates one exemplary configuration of an IP-PBX system based in part on the high-level architecture LAN-WAN and IP-PSTN interconnectivity illustrated in FIG. 1.

Finally, a fifth LAN, LAN 14, and a sixth LAN, LAN 24, represent a first site and a second site, respectively, of an Enterprise B. The various IP Clouds representing LAN 14 and LAN 24 have been designated with solid lines to visually pair them together, and to distinguish them from the other LANs of FIG. 1. Both the first site (i.e., LAN 14) and the second site (i.e., LAN 24) of Enterprise B include Enterprise PSTN Gateways, 42 and 46 respectively. Enterprise PSTN Gateways 42 and 46 indicate that IP PBX is used for IP telephony services, including interworking with PSTN 2. As with LAN 18 and LAN 22, WAN 12 provides LAN 14 and 24 with VPN interconnections, in addition to WAN access and bandwidth. FIGS. 2 and 3 illustrate alternative configurations for the IP Centrex and the IP PBX network architecture illustrated in FIG. 1.

The term LAN is used herein to distinguish a largely self-contained network external to a WAN. The LAN relies on a WAN for global IP access as well as interconnectivity with other LANs in the network. Therefore, the term LAN as it is used herein may comprise a single subnet. Alternatively, a LAN may comprise several subnets behind a common aggregation router that interfaces to a WAN. Such a definition may be broader than a common usage of the term LAN, where such term may typically refer to a small network or subnet. For example, as a representative university network, the fourth LAN of FIG. 1, LAN 16, may comprise several subnets. Each of these several subnets could itself be considered to be a LAN in a more restricted sense of this term. However, from the perspective of the WAN, the collection of subnets and small LANs that make up the exemplary university network appears as distinct "island" network with a well-defined access interface. Hence the term LAN 16 is understood to refer to the entire collection of included subnets.

Similarly, the other LANs 18, 22, 14, and 24 may be considered enterprise networks, each containing multiple subnets. But each LAN is distinct from, and has a defined access interface to, WAN 12. This point about the usage herein of the term LAN is emphasized so as to avoid confusion with the more restricted (and more common) usage of the term.

FIG. 2a illustrates a first exemplary IP telephony network configuration 100 of an IP Centrex based network based in part on the network architecture 10 illustrated in FIG. 1. LANs 18 and 22 from FIG. 1 are used for this illustration while various other LANs 14, 16, 20, and 24 of FIG. 1 have been omitted for brevity and clarity. FIG. 2 comprises various IP telephony network elements including PSTN 2, LAN 18, WAN 12, and LAN 22.

In IP telephony network configuration 100, the only two LANs, LAN 18 and LAN 22, have been expanded to show the multiple subnets at the respective sites, as well as the aggregation of the subnets at the LAN border router at each site. Some representative IP phones are also included in the figure. It should be noted that although first exemplary IP telephony network configuration 100 in FIG. 1 illustrates IP phones, such phones could also comprise any type of IP telephony client device such as a software-based client that runs on a laptop or desktop computer, or a pocket-sized Personal Digital Assistance (PDA) that runs IP telephony software. For example, LAN 18 has been illustrated to comprise a plurality of IP phones 82 while LAN 22 has been illustrated to comprise a plurality of IP Phones 84. In an alternative arrangement, LAN 18 could comprise a plurality of IP telephony client devices as well as LAN 22.

As previously described in reference to FIG. 1, WAN 12 comprises three servers. In arrangement 100, these WAN servers comprise a SIP Proxy Server 102, an AAA Server 104, and a Directory Server 106. These three WAN Servers 102, 104, and 106 are identified according to typical functionality of IP telephony; for example SIP Proxy server 102, Authentication-Authorization-Accounting (AAA) server 104, and Directory server 106. Note that these names are only indicative of the types of services typically included in an IP telephony system, and that other types of service may also included. WAN servers 102, 104, and 106 are not intended to either limit or preclude additional types or numbers of WAN servers for IP telephony or other types of services. Since both LANs 18 and 22 comprise IP Centrex LANs, in 100, IP telephony services will be provided by a WAN service provider and therefore the servers in LAN 18 and 22 are still generically identified. That is, the LAN servers 54 and 56 are not necessarily part of the IP telephony services being considered in arrangement 100.

For IP telephony sessions or calls either originating or terminating at the IP telephony client devices in Enterprise A (either LAN 18 or LAN 22), signaling and call control may be handled by WAN-based servers 102, 104, or 106. For example, WAN-based SIP Proxy Server 102 could be the first point of contact for a SIP INVITE from such a client device.

SIP is described in Handley, et al., "SIP: Session Initiation Protocol," Internet Engineering Task Force Request For Comments 2543 (IETF RFC 2543), March 1999, which is entirely incorporated by reference herein, as if fully set forth in this description. The SIP is also described in Rosenberg et al., "SIP: Session Initiation Protocol," IETF RFC 3261, June 2002, the contents of which are fully incorporated herein by reference, as if fully set forth in this description. Other signaling protocols, such as H.323, the Media Gateway Control Protocol ("MGCP"), the Media Gateway Control Protocol ("MEGACO"), and other standard or proprietary techniques may alternatively be used. RFC 3508 that describes the H.323 protocol, RFC 2705 that describes the MGCP, and RFC 3015 that describes the MEGACO are each entirely incorporated by reference herein, as if fully set forth in this description.

The SIP describes how to set up Internet telephone calls, videoconferences, and other multimedia connections. SIP can establish two-party sessions (ordinary telephone calls), multiparty sessions (where everyone can hear and speak), and multicast sessions (one sender, many receivers). The sessions may contain audio, video, or data. SIP handles call setup, call management, and call termination and may use other protocols to do so, such as RTP for transporting real-time data and providing Quality of Service ("QoS") feedback, and the Real-Time Streaming Protocol ("RTSP") for controlling delivery of streaming media. (RFC 1889 that describes RTP and RFC 2326 that describes RTSP are both entirely incorporated by reference herein, as if fully set forth in this description). SIP is an application layer protocol and can run over the user datagram protocol ("UDP") or the transport control protocol ("TCP"), for example.

SIP supports a variety of services, including locating the callee, determining the callee's capabilities, and handling the mechanics of call setup and termination, for example. SIP defines telephone numbers as uniform resource locators ("URLs"), so that Web pages can contain them, allowing a click on a link to initiate a telephone call (similar to the mailto function that allows a click on a link to initiate a program to send an e-mail message). For example, John_Doe@3Com.com may represent a user named John at the host specified by the domain name system ("DNS") of 3Com. SIP URLs may also contain other addresses or actual telephone numbers.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

As an example, consider the following exemplary text encoded message.

```
INVITE sip:user@biloxi.com SIP/2.0
Via: SIP/2.0/UDP
pc33.atlanta.com;branch=z9hG4bK776asdhds
Max-Forwards: 70
To: User <sip:user@biloxi.com>
From: Sender <sip:sender@atlanta.com>;tag=1928301774
Call-ID: a84b4c76e66710@pc33.atlanta.com
CSeq: 314159 INVITE
Contact: <sip:sender@pc33.atlanta.com>
Content-Type: application/sdp
Content-Length: 142
```

The first line of this text-encoded message contains the method name (e.g., INVITE). The lines that follow are a list of header fields. For example, the header fields are Via (describing the address at which the user is expecting to receive responses), To (contains a display name or SIP request-URI towards which the request was originally directed), From (contains a display name and a SIP request-URI that indicate the originator of the request), Call-ID (contains a globally unique identifier for this call), CSeq (a traditional sequence number), Contact (contains a SIP request-URI that represents a direct route to contact the sender), and Content-Type (information about the type of session that should be established, e.g., the Session Description Protocol ("SDP"), which describes parameters like type of media streams). In addition, the From header also has a tag parameter containing a random string (e.g., 1928301774) that is used for identification purposes.

Other example methods are provided below in Table 1.

TABLE 1

| METHOD | DESCRIPTION |
| --- | --- |
| INVITE | Request initiation of a session |
| ACK | Confirm that a session has been initiated |
| BYE | Request termination of a session |
| OPTIONS | Query a host about its capabilities |
| CANCEL | Cancel a pending request |
| REGISTER | Inform a redirection server about the user's current location |
| NOTIFY | Indicates the status of a request |
| REFER | Requests that the party sending the REFER be notified of the outcome of the referenced request |

Returning to FIG. 2, WAN-based directory server 106 could be queried for session routing information. For sessions with one party in PSTN 2, Network PSTN Gateway 36 would provide interworking with the WAN-based IP telephony portions of the calls. Because IP network configuration 100 represents essentially an IP Centrex system, the WAN-based system presents to each subscriber (i.e., each enterprise) an appearance of a virtually private IP telephony service. That is, the features and services provided to each of possibly multiple subscribers must appear to each subscriber (i.e., each enterprise) as a private system. Such is true even though the WAN-based system may implement these services and features on common equipment, within a common hardware and software environment.

FIG. 3 shows one exemplary IP network configuration 150 based upon the architecture 10 shown in FIG. 1. The fifth and sixth LANs of FIG. 1, LAN 14 and 24, are used for this illustration. The other LANs of FIG. 1 are omitted for clarity. In FIG. 3, LAN 14 and 24 have been expanded to show the multiple subnets at the respective sites, as well as the aggregation of the subnets at a LAN border router located at each site. Some representative IP phones are also included in FIG. 3. For example, LAN 14 comprises a first plurality of IP Phones 154 and LAN 24 comprises a second plurality of IP Phones 152. In an alternative arrangement, although IP network configuration 150 illustrates IP telephony phones, other IP telephony client devices may also be used, such as software-based IP phones running on laptop or hand-held computers. In addition, LAN Server 48 of LAN 24 and LAN Server 60 of LAN 14 from FIG. 1 have been further defined in FIG. 2 as comprising Call Processing Servers 156 and 158, respectively.

Call Processing Servers 156, 158 are intended to represent one or more software programs, and one or more hardware platforms, which collectively support typical IP telephony services. Exemplary Call Processing Servers could comprise a SIP Proxy server, AAA server, and/or a Directory server. These server names are merely indicative of certain types of services that may be typically included in an IP telephony system. In an alternative arrangement, other types or services may also provided. They are not intended to limit or preclude additional types or numbers of LAN servers for IP telephony or other types of services. Because WAN 12 does not directly provide IP telephony services, WAN servers 26, 28, 30 are still generically identified; i.e., they are not necessarily part of the IP telephony services being considered here.

Interconnectivity between the first site (i.e, LAN 14) and the second site (i.e, LAN 24) of enterprise B may be supported by a VPN that terminates on the respective LAN border routers, for example. For IP telephony calls originating or terminating at client devices in Enterprise B, signaling and call control is handled by the LAN-based servers in one or both of the sites. For example, the LAN-based SIP Proxy in site 1 (LAN 14) could be the first point of contact for a SIP INVITE from a client device in site 1. The LAN-based directory server could be queried for routing information. For calls with one party in PSTN 2, Enterprise PSTN Gateway 42 would provide interworking with the LAN-based IP telephony portions of the calls. Being an IP PBX network arrangement, the LAN-based system illustrated in FIG. 3 will implement a private IP telephony service. That is, the features and services provided are private to the enterprise that deploys the system by virtue of the exclusivity of the hardware and software equipment to the owner of the LAN.

PSTN Fallback Routing of New Calls

An IP telephony session wherein one terminating client is in an IP network and the other client is in a PSTN are supported by a PSTN gateway. That is, network PSTN Gateway for IP Centrex as illustrated in FIG. 2 and Enterprise PSTN Gateway for IP PBX as illustrated in FIG. 3 network for IP Centrex, enterprise for IP PBX. This also applies for N-party calls where N>2, if at least one party is in the IP network and at least one party is in the PSTN. Calls in which all (N≥2) terminating clients are in the IP network, herein referred to as IP-only calls, may be supported entirely within the IP network, without the need for a PSTN gateway. That is, IP transport and protocols are used end-to-end.

IP-only calls may occasionally be subject to various types of IP network problems, failures, program decisions, routing impediments, or interruptions. Such interruptions could include link failures, unavailability of bandwidth, etc. Depending upon the type of problem or failure, and the routing of the call, recovery may be achievable through standard IP methods, such as alternate path routing. However, for some types of IP network failures and call routes, a Network or Enterprise PSTN Gateway may provide an advantageous method for fallback routing of new IP-only calls. This approach uses a PSTN to route around the IP network problem, employing the PSTN gateway(s) for interworking between the PSTN and the problem-free portion(s) of the IP network. Known methods based upon PSTN fallback address the situation in which the inability to provide an IP-only route is known prior to the placement of a new call, or discovered during the signaling of a new call. That is, known methods address the situation in which the inability to provide an IP-only route before the new call is successfully set up.

Before describing the system and method for dynamic switchover of active calls through a PSTN gateway, a few representative failure scenarios will be presented. These representative scenarios can help identify those types of failures that can be addressed by either the existing approaches or by the new approach proposed here, and those types that cannot be addressed with PSTN fallback routing. These scenarios may be distinguished based upon a network location of the PSTN gateway. That is, whether the network includes a WAN based PSTN gateway or an LAN based PSTN gateway. These two different types of PSTN gateways will delineate a segment or segments of an IP-only call that can benefit from PSTN fallback routing.

As used herein, the terms "network failure," "network problem," "network unavailability," or other similar terms are meant to signify some type of network parameter or program decision that prevents route establishment or maintenance on some network segment or path. "Network failure," "network problem," or "network unavailability" may occur for a variety of reasons. For example, one such condition could arise as a result of a failed router, a failed WAN-LAN link, a maintenance outage, excessive network congestion, or preemption of low-priority traffic by higher-priority traffic. Other reasons for unavailability conditions may also be possible. In the context of PSTN fallback routing, a specific reason for unavailability may not be important. The relevant point is that a particular IP network route or path is unavailable, and that a PSTN fallback route may, in some cases, be the preferred workaround. The method of PSTN fallback routing, both for new calls and active calls, applies for those instances when one or more PSTN fallback routes are available for a workaround, and are the preferred route for workaround.

WAN-Based PSTN Gateway

Following the terminology introduced and defined herein, a WAN-based PTSN Gateway is represented by a Network PSTN Gateway. In FIG. 1, only a single, representative Network PSTN Gateway 36 is shown and this PSTN Gateway 36 links WAN 12 with PSTN 2. However, it is more likely that multiple PSTN Gateways will be deployed in various locations, interconnecting with different PSTN switches, and perhaps even different PSTN carriers. As noted in the description of FIG. 1, WAN 12 may actually represent multiple WAN or IP backbone providers. Therefore, an IP-only call that traverses a WAN, such as WAN 12, may in fact cross one or more network segments that, in the case of a failure or impediment, could be bridged by the PSTN, with a Network PSTN Gateway at either end of the bridge.

Figure 4:
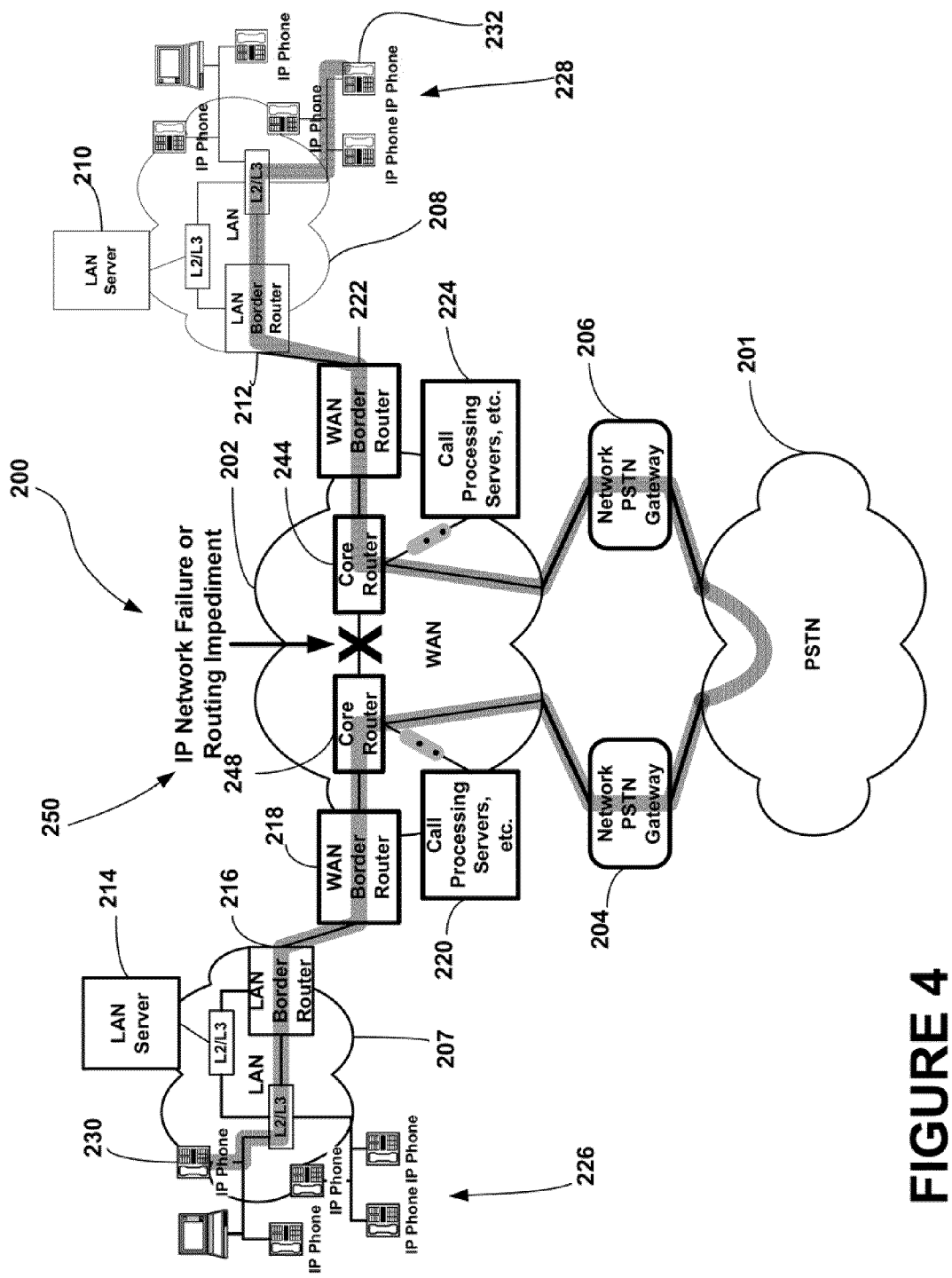
FIG. 4 illustrates one possible arrangement for routing a new call through Network PSTN Gateway in the event of an IP routing impediment.

FIG. 4 illustrates one such possible network configuration 200 wherein an IP-only call that traverses a WAN and crosses one or more network segments that, in the case of failure, could be bridged by the PSTN, with a Network PSTN gateway at either end of the bridge. As illustrated in FIG. 4, network configuration 200 comprises WAN, two Network PSTN Gateways 204, 206, PSTN 201, and two LANs 207, and 208.

In FIG. 4, WAN 202 is represented by a single cloud, but now two Network PSTN Gateways 204, 206 are provided. Network PSTN Gateways 204, 206 may, for example, be in different cities, they may be served by the same WAN provider; or they may each belong to a different WAN provider. In the case where Network PSTN Gateways 204, 206 each belong to a different WAN provider, the single WAN 202 cloud in the FIG. 4 would actually represent two providers having mutual connectivity. LAN 207 and LAN 208 are commutatively coupled to WAN 202. In this arrangement, a call from a first IP client device 230 of a first plurality of IP phones 226 in LAN 207 is connected to a second IP client device 232 in a second plurality of IP Phones 228 of LAN 208. As noted in FIG. 4, a portion of IP path 201 in WAN 202 is experiencing an IP network failure or routing impediment 250. This portion of IP path 201 in WAN 202 is therefore currently unavailable. Consequently, this portion of the call is routed through PSTN 201, via Network PSTN Gateways 204, 206.

Since only new IP calls are so far being considered, the PSTN fallback routing can be accomplished by pre-configuring a WAN signaling and call control elements to select an alternate, PSTN route in the event that a preferred IP-only route is unavailable at a time the call is being set up. One way to achieve this is to provide the directory server with multiple routes for any given call. Then, the signaling component (e.g., SIP Proxy) can be utilized to select an ideal route. Alternatively, a directory server could select the best route based upon knowledge of network status. Other approaches are also possible. Whatever the method for choosing an ideal route, the assumption for PSTN fallback routing is that the "best route" is determined to be through the PSTN 201. In any case, so long as both the originating and terminating LANs are reachable by the appropriate Network PSTN Gateways, then this routing should be possible.

If an IP network impediment is such that one or both of the LANs cannot communicate with the appropriate Network PSTN Gateway, then PSTN fallback routing between the two LANs will not be possible. In particular, if either LAN 207 or LAN 208 loses its connection to WAN 202, then PSTN calls of any type, including fallback routing, will be disabled for the effected LAN. That is, for a LAN with exclusively WAN-based PSTN access (via a Network PSTN Gateway such as Gateways 204 or 206), the WAN-LAN link represents a potential single point of failure.

In contrast, IP network impediments or problems internal to a WAN are likely to have IP-based workarounds. Consequently, impediments internal to WAN 202 in which PSTN fallback routing is the preferred workaround may not occur often. Nevertheless, for such cases, PSTN fallback routing within WAN 202 is useful.

LAN-Based PSTN Gateway

Following the terminology herein introduced and defined, the LAN-based PTSN Gateway will be referenced as an Enterprise PSTN Gateway. For example, returning to the high-level architecture for LAN-WAN and IP-PSTN interconnectivity illustrated in FIG. 1, Enterprise PSTN Gateways 42, 44, and 46 provide a direct connection between LANs 14, 16, and 24 and PSTN 2, respectively. Therefore, if the link between any of these LANs 14, 16, and 24 and WAN 12 fails, or if the link is unable to accommodate a new call, that new call can be routed through PSTN 2 via a LAN's Enterprise PSTN Gateway. In other words, the LAN-WAN link is not a potential single point of failure, at least for IP telephony calls to or from the LAN.

Figure 5:
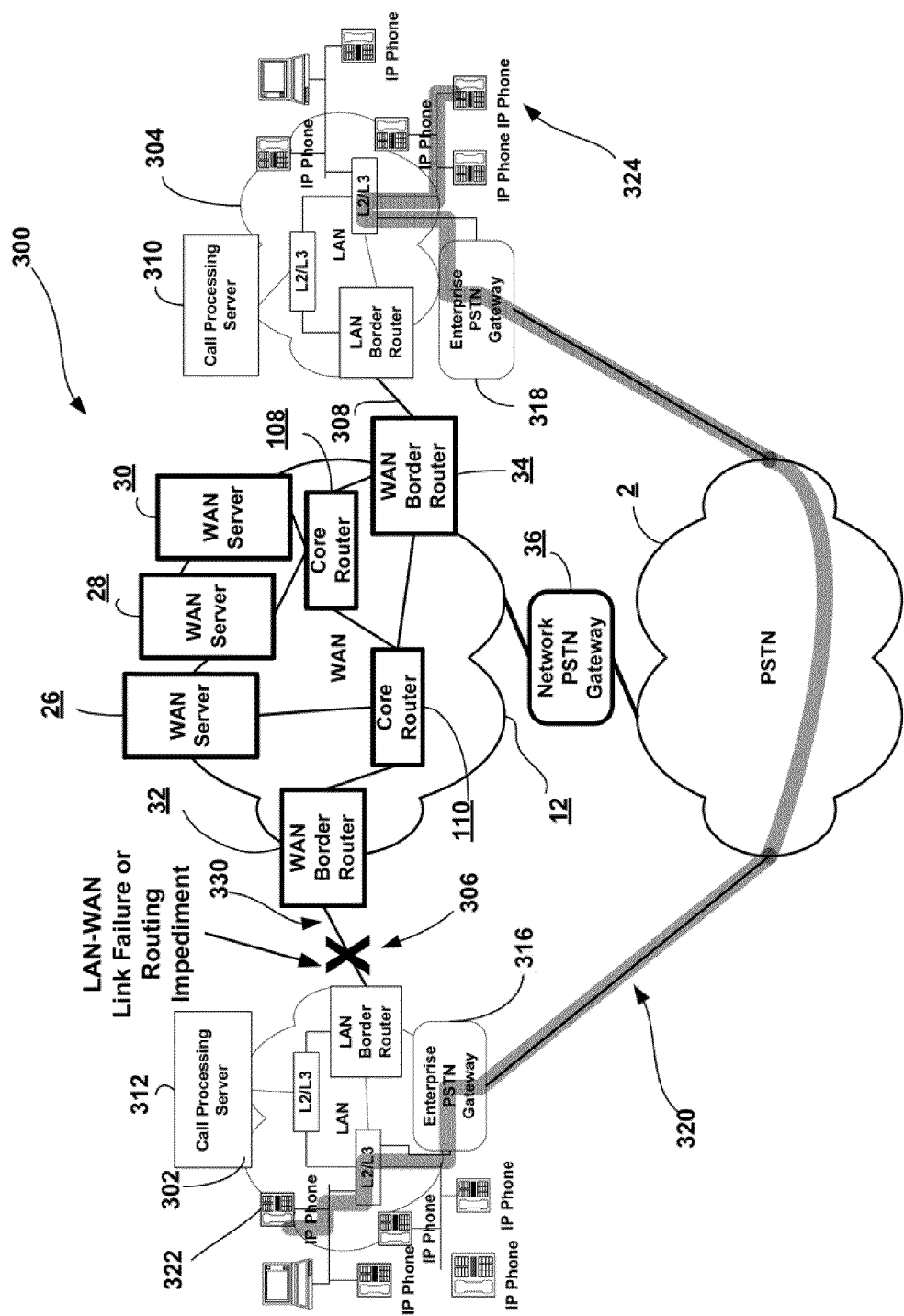
FIG. 5 illustrates one possible configuration for routing a call through PSTN in the event of a LAN-WAN routing impediment.

FIG. 5 illustrates one possible configuration 300 for routing a new call through PSTN in the event of a LAN-WAN link failure. As illustrated in FIG. 5, two LANs, LAN 302 and 304 are shown connected WAN 12. LAN 302 and LAN 304 each include an Enterprise PSTN Gateway, 316 and 318, respectively. LAN 302 is configured to WAN 12 via LAN-WAN link 306. Similarly, LAN 304 is configured to WAN 12 via LAN-WAN link 308. LAN 302 communicates with WAN 12 over LAN-WINK 330 and LAN 304 communicates with WAN 12 over LAN-WAN link 308.

In FIG. 5, one of LAN-WAN links 330 is illustrated as experiencing a routing impediment 306. Consequently, LAN-WAN link 330 will be unavailable at a time when a new IP telephony call is made between the first LAN 302 and the second LAN 304. In network arrangement 300, a new IP telephony call 320 is made. IP telephony call 320 is made between IP Phone 322 of LAN 302 and IP Phone 324 of LAN 304. Therefore, new IP telephony call 320 is routed through PSTN 2. Even though only the first LAN 302 and not the second LAN 304 has suffered a failed LAN-WAN link, the PSTN call routing is between the first and the second Enterprise PSTN Gateways 316, 318. That is, even though LAN 304 continues to have an operational LAN-WAN link 308, LAN 304 continues to utilize Enterprise PSTN Gateway 318 to connect IP telephony call 320.

Those of ordinary skill in the art will recognize that this routing configuration is just one possible PSTN fallback workaround. For example, in one alternative arrangement, the PSTN segment of an alternative route could be terminated between Enterprise PSTN Gateway 316 of LAN 302 having the failed LAN-WAN link 306 and a Network PSTN Gateway 36 in WAN 12. Such an alternative configuration is described below with reference to FIG. 6.

Again, since only new IP calls are so far being considered, the PSTN fallback routing can be accomplished by pre-configuring the signaling and call control elements to select the alternate, PSTN route in the event that the preferred IP-only route is unavailable at call set up. In this case, the relevant signaling components are in a LAN. As with the WAN network architecture illustrated in FIG. 5, alternate routing may be achieved by provisioning directory server with multiple routes for any given call, and letting the signaling component (e.g., SIP Proxy) choose a best route.

Alternatively, a directory server could select an optimum route based upon knowledge of network status and/or LAN-WAN link status. Other alternatives are also possible. Whatever the method for choosing an ideal route, the assumption for PSTN fallback routing is that "an ideal route" is determined to be through the PSTN. In the case of a LAN-WAN link failure, a Network Enterprise Gateway may in fact offer the only alternative route for calls to or from devices in the LAN with the link failure.

Mixed WAN-Based and LAN-Based PSTN Gateways

The case of mixed WAN-based and LAN-based PSTN gateways (or, following FIG. 1, Network and Enterprise Gateways, respectively) applies when a PSTN fallback path is terminated at one end by a Network PSTN Gateway, and at the other end by an Enterprise PSTN Gateway. There are at least two scenarios in which this could occur. Both scenarios arise for calls placed between IP phones located in separate LANs and that rely on a WAN for connectivity.

In the first scenario, a call is placed from a first IP client device at a first LAN to a second IP client device located at a second LAN. The first LAN will include an Enterprise PSTN Gateway, while the second LAN does not include an Enterprise PSTN Gateway. If the LAN that includes the Enterprise PSTN Gateway experiences a LAN-WAN link failure or some type of routing impediment, then the first LAN can route the call via its Enterprise PSTN Gateway over the PSTN to the second LAN. If one such call terminates in the second LAN that does not include an Enterprise PSTN Gateway, then the Network PSTN Gateway of the WAN can be used to terminate the PSTN leg of the call. The remaining call path may then be routed as usual over the IP networks, in this case, over WAN 12 and LAN.

Figure 6:
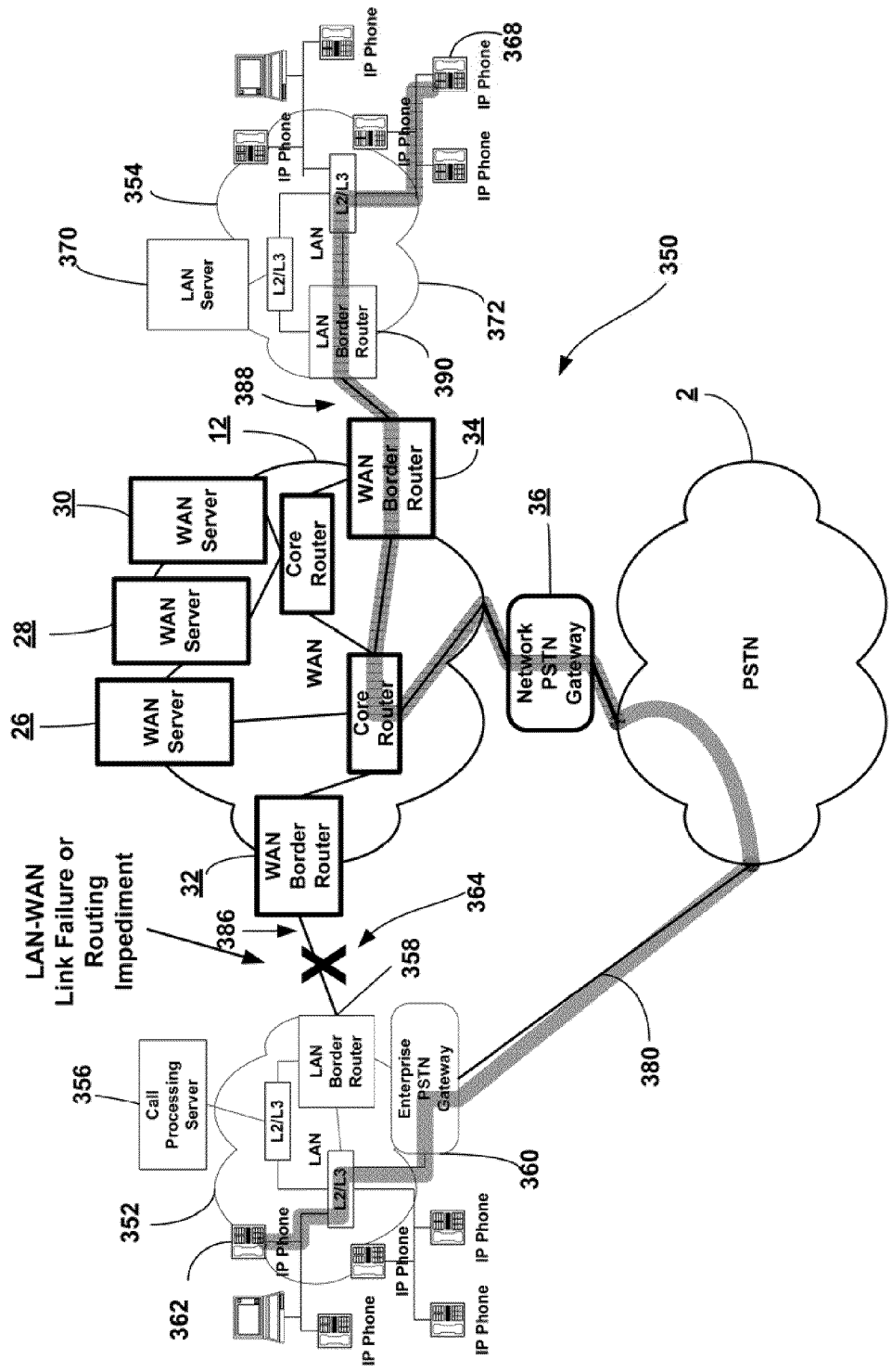
FIG. 6 illustrates an alternative arrangement for routing a call through PSTN in the event of a LAN-WAN routing impediment.

This first scenario is illustrated in FIG. 6. As shown in FIG. 6, a first LAN 352 comprises a call processing server 356, a LAN Border Router 358, and an Enterprise PSTN Gateway 360. The second LAN 354 comprises a LAN Border Router 390, a LAN Server 370 but does not include an Enterprise PSTN Gateway. LAN 352 utilizes its LAN Border Router 358 to communicate with WAN 12 over LAN-WAN link 386. Similarly, LAN 354 utilizes its LAN Border Router 390 to communicate with WAN 12 over LAN-WAN link 388.

Figure 7:
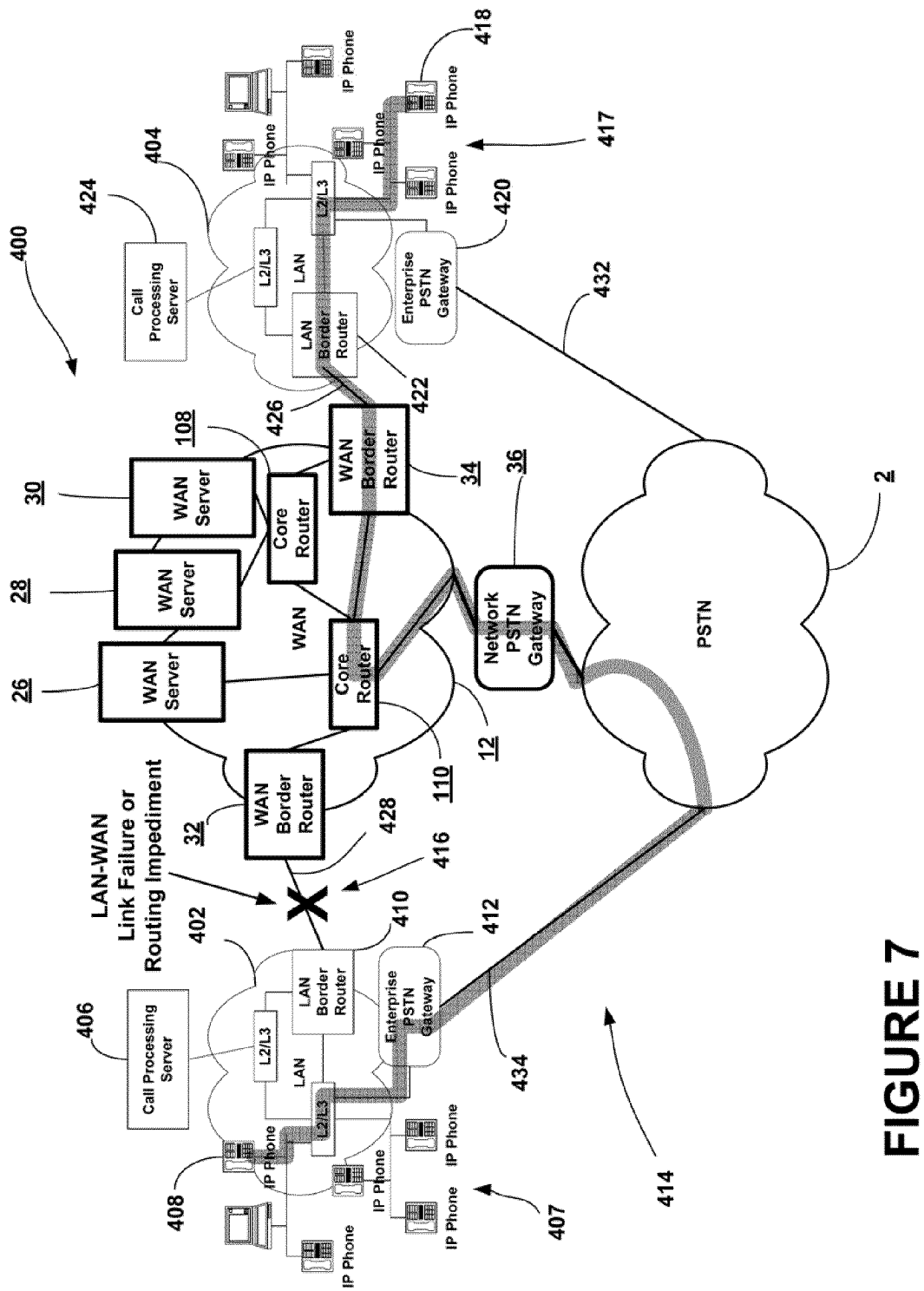
FIG. 7 illustrates yet another alternative configuration for routing a call through PSTN in the event of a LAN-WAN routing impediment.

The second scenario is illustrated in FIG. 7. In this second scenario, both LANs comprise Enterprise PSTN Gateways. For example, as illustrated in FIG. 7, LAN 402 comprises LAN Border Router 410, Call Processing Server 406, a plurality of IP client devices 407, and an Enterprise PSTN Gateway 412. Similarly, LAN 404 comprises LAN Border Router 422, Call Processing Server 424, a plurality of IP client devices 417, and an Enterprise PSTN Gateway 420. It is assumed, in this network architecture 400, that an existing IP telephony call occurs between a first IP client device 408 in LAN 402 and a second IP client device 418 of LAN 404. However, in this alternative scenario, LAN 402 utilizes LAN Border Router 410 to communicate over LAN-WAN link 428 with WAN 12. In an alternative session routing scenario, LAN 402 utilizes Enterprise PSTN Gateway 412 to communicate over LAN-PSTN link 434 with PSTN 2.

Similarly, LAN 404 utilizes LAN Border Router 422 to communicate with WAN 12 over LAN-WAN link 426 with WAN Border Router 34. In an alternative session routing scenario, LAN 404 utilizes Enterprise PSTN Gateway 420 to communicate with PSTN 2 over LAN-PSTN link 432. In this second scenario, it is assumed that LAN-WAN link 426 residing between LAN 402 and WAN 12 experiences a link failure or routing impediment 416 as previously discussed. In the discussion of this situation above, the PSTN fallback route terminated on the Enterprise PSTN Gateways in each LAN, even though only one LAN experienced a LAN-WAN link failure. The network architecture illustrated in FIG. 7 represents an alterative in which LAN 402 experiencing routing impediment 416 in WAN-LAN link 428 will now utilize Enterprise PSTN Gateway 412 to establish LAN-PSTN link 434. However, the second LAN, LAN 404, that is not currently experiencing a failure or impediment in its WAN-LAN link 426 continues to utilize its IP access through WAN 12. Network PSTN Gateway 36 of WAN 12 terminates the PSTN fallback route 432 from Enterprise PSTN Gateway 420 of LAN 404. Routing of the IP telephony session therefore continues between Network PSTN Gateway 36 and LAN 404 over LAN-WAN link 426 that is not currently experiencing a failure or routing impediment.

In the scenario illustrated in FIG. 6, a mixed Network and Enterprise PSTN Gateway solution is the only option for PSTN IP telephony session rerouting. That is, the mixed gateway solution utilizes Enterprise PSTN Gateway 360 of LAN 352 and Network PSTN Gateway 36 of WAN 12, since LAN 354 does not have an Enterprise PSTN Gateway and therefore must rely on WAN 12 Network PSTN Gateway 36 for PSTN connectivity. In the alternative scenario illustrated in FIG. 7, the use of Network PSTN Gateway 36 instead of Enterprise PSTN Gateway 420 of LAN 404 that is not experiencing a routing impediment in LAN-WAN link 426 is not necessarily required by the topology. The choice to use Network PSTN Gateway 36 in the network architecture illustrated in FIG. 7 depends on a number of considerations. Such considerations include but are not necessarily limited to the optimization of resource utilization, ease of implementation, as well as other operational factors and considerations. For example, one reason for not utilizing Enterprise PSTN Gateway 420 could be to accommodate least-cost routing decisions.

Method and System for Active Call Switchover

The previous discussion provided a generally detailed explanation of various arrangements of LAN-WAN IP mixed network architectures and how IP telephony sessions may be rerouted within these structures if a routing impediment occurs. However, these various mixed network architectures for PSTN fallback may be described in more general terms in order to decouple it from specific failure topologies such as those discussed in FIGS. 1-7. This allows the fundamental requirements of PSTN fallback routing to be more generally defined. The requirements may then extended to cover dynamic switchover of active IP telephony calls.

In order to describe a more general description of PSTN fallback routing, four terms descriptive of a network topology and components near the failure are introduced. These four terms include: (i) failure point, (ii) failure zone, (iii) functional zones, and (iv) failure boundary. Each of these terms is described below. As discussed previously, the use of the term "failure" should be taken in the generic sense to include all types of routing impediments including program decisions.

The first term, failure point, represents a location in an IP network that presents a routing impediment. For example, such a routing impediment could be a complete failure (e.g., a hardware, software, network, or other system breakdown), a severe congestion, an intentional maintenance outage, or a policy-based denial of service. As those of ordinary skill will recognize, other types of long term, short term, or temporary impediments may also be possible. In addition, the failure point could involve a single network component, such as a LAN Border Router, a WAN Border Router, or a Core Router. Alternatively, such a failure point could comprise a network segment that connects to two or more other network regions. Other topologies and components involved in the failure point are also possible.

The second term, failure zone, represents a portion of an IP network that contains a failure point. Within a failure zone, there may be IP source and destination address pairs that are unaffected, minimally effected, or drastically affected by the presence of a failure point. For example, IP source and destination address pairs for which a preferred routing would not pass through the failure point are unaffected, while those for which alternative IP routing is available, even if a preferred routing would pass through the failure point, may be minimally effected.

The third term, functional zone(s), represent two or more portions of an IP network separated by a failure zone. In such a functional zone, the only viable inter-functional-zone routing must pass through the failure point. The meaning of "viable" is explained in further detail below. Within each functional zone, routing and network elements function properly (i.e., at least as desired). The functional zone could be a network segment such as a LAN or subnet; other topologies are possible. Each functional zone comprises one or more IP telephony client devices, one or more call processing servers, and one or more PSTN gateways. Each functional zone also comprises a boundary element. It is this boundary element that serves as the routing link between a functional zone and an adjacent failure zone. The boundary element may also be capable of monitoring network status in a failure zone, as well as providing that status to the call processing server(s) in its functional zone. It may also include such boundary functions as firewall, NAT, and ALG.

A functional zone may be separated from a failure point by one or more operational IP routes in the failure zone which lead to useful destinations in the IP network. That is, IP traffic crossing from a functional zone into a failure zone may be routed to a plurality of intended destinations. However, traffic between pairs of functional zones must take a route that passes through the failure point.

The fourth term, failure boundary represents a delineation in an IP network between a failure zone and a functional zone. The failure boundary is topologically adjacent to a boundary element in a functional zone. That is, traffic crossing from a functional zone to a failure zone exits from the boundary element. Traffic crossing from a failure zone to a functional zone enters the boundary element. In one arrangement, a functional zone could contain more than one boundary element, but all of the (possibly) multiple boundary elements ultimately connect to the failure point for IP telephony session traffic to or from another functional zone.

Figure 8:
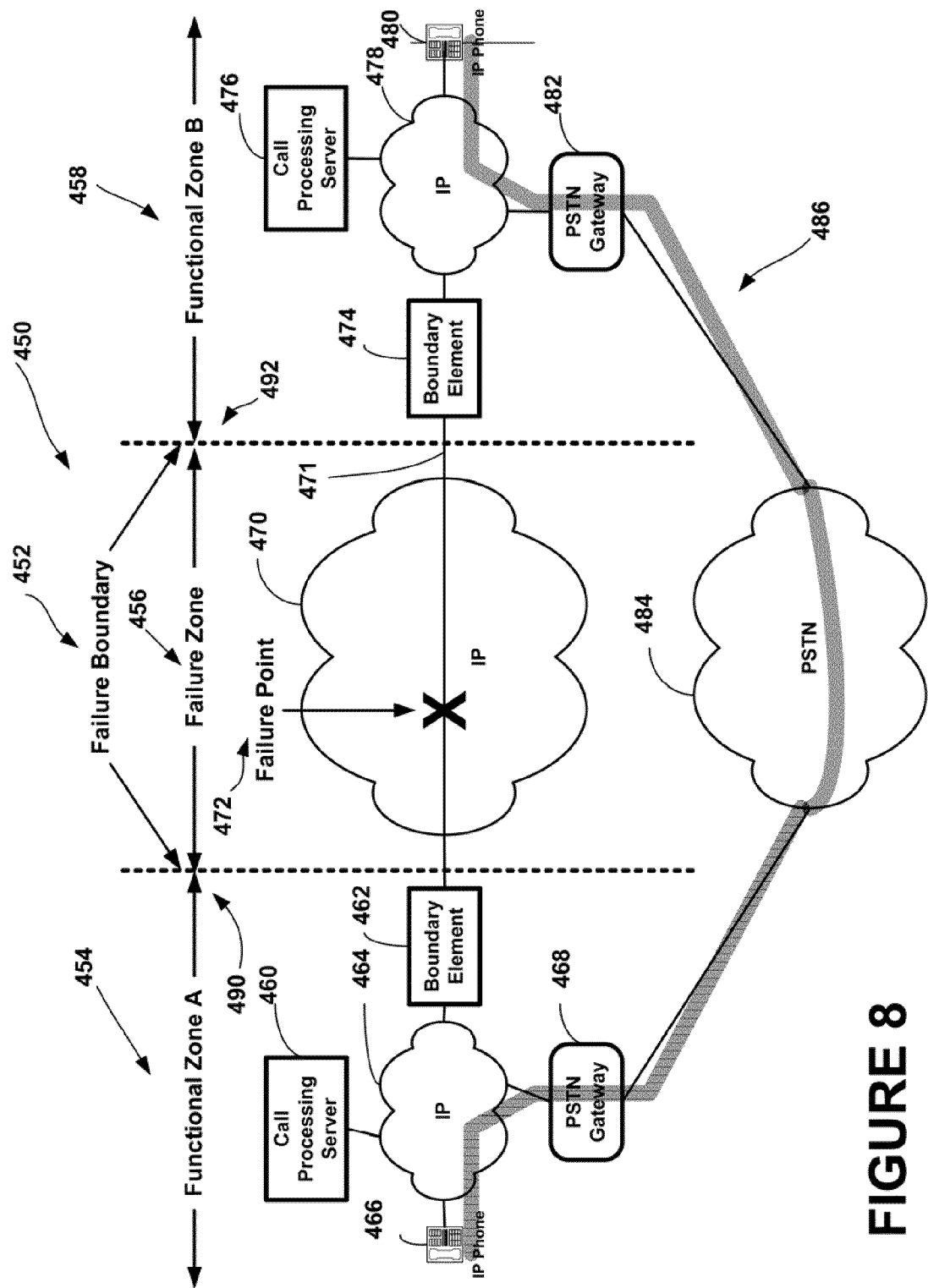
FIG. 8 illustrates yet another alternative arrangement for routing a call through PSTN in the event of a LAN-WAN routing impediment.

FIG. 8 illustrates an IP network arrangement 450 that provides for PSTN IP telephony rerouting and that illustrates an arrangement of these terms. For example, FIG. 8 illustrates an IP network arrangement 450 for routing an IP telephony session between a first IP client device 466 and a second IP client device 480. The IP network arrangement 450 comprises a first Functional Zone A 454, a Failure Zone 456 comprising a failure boundary 452, and a second Function Zone B 458.

First Functional Zone A 454 comprises a first IP cloud 464, a boundary element 462, a Call Processing Server 460, an IP Device 466, a first IP client device 466, and a PSTN Gateway 468. Similarly, Functional Zone B comprises a second IP cloud 478, a boundary element 474, a call processing server 476, a second IP Client Device 480, and a PSTN Gateway 468. In both Functional Zone A 454 and Functional Zone B 458, IP Client Devices 466 and 480 comprise IP Telephony Phones. In one arrangement, IP Client Devices 466 and 480 comprise IP Telephony SIP Phones. In an alternative arrangement, IP Client Devices 466 and 480 comprise IP H.323 Telephony Phones. However, those of ordinary skill in the art will recognize that other types of IP Client Devices may also be used. For example, IP phones that use remote control protocols, such as MGCP, could also be included, as well as PSTN phones that connect to the local IP network via an adapter device.

In network architecture 450, second IP cloud 478 is coupled to IP cloud 470 via a boundary element 474. Similarly, first IP cloud 464 is coupled to IP cloud 464 via a boundary element 462. The common label of "IP" for all three clouds 478, 470, and 464 is meant to convey that these IP clouds could represent segments. Alternatively, these three clouds 478, 470, and 464 could represent subnets of a same WAN, of two different LANs and of one WAN, or any of several other combinations of LANs, WANs, or subnets. There is, therefore, no restriction on network topology, beyond the specifications of the definitions, are intended. Depending upon the specific example of fallback routing, Boundary Elements 462 and 474 could incorporate functionality for enhancing the fallback routing method and system.

Both the first IP cloud 464 and the second IP cloud comprise Call Processing Servers 460, and 476, respectively. The Call Processing Servers 460, 476, the Boundary Elements 462 and 474, and the PSTN Gateways 468, 482 illustrated in FIG. 8 are logical network elements. Therefore, these network elements could be implemented in an actual network as distinct network devices. Alternatively, these network elements could be combined in one or more common hardware and/or software platforms. In addition, each of the Functional or Failure Zones could comprise additional network elements and/or components.

In the IP network arrangement illustrated in FIG. 8, where IP cloud 470 experiences a failure point 472, this will result in there being no viable route between Boundary Element 474 of first Functional Zone A 454 and Boundary Element 462 of second Functional Zone B 458. The term "viable" is meant to designate that, in the absence of an IP route 471 that would normally pass through the location (or locus) of failure point 472, alternative IP routes are either not available, or would not or could not be used for some reason.

Therefore, in the network architecture 450 illustrated in FIG. 8, an optimal and/or most preferable alternative to avoid Failure Point 472 is for network 450 to utilize an alternative PSTN route, via a PSTN Gateways 486 of IP cloud 464 and a PSTN Gateway 482 of IP Cloud 478 in each functional zone. Depending upon the specific configuration, PSTN route 486 could be the best alternative, or the only alternative route. For example, if Functional Zone A 454 comprises a LAN whose only WAN access is via a failed LAN-WAN link, then the PSTN route would be the sole alternative route. If, instead, all three zones, Functional Zone A 454, Functional Zone B 458, and Failure Zone 456 were part of a WAN, and IP routing alternatives to the failure point are not as cost effective than the PSTN route, then PSTN fallback may just be the best alternative.

Using these definitions, PSTN fallback routing can now be recast as a PSTN route between two functional zones via PSTN Gateways associated with those zones. A PSTN fallback routing path is designated by PSTN routing path 486 in FIG. 8. Path 486 extends from a first IP Client Device 466 of IP cloud 464 to a second IP Client Device 480 of IP cloud 478. Fallback routing path 486 is chosen since IP cloud 470 experiences a failure point 472. Consequently, IP cloud 470 will define a failure zone 456. This failure zone 456 comprises both a first failure boundary 490 and a second failure boundary 492, respectively. First boundary point 490 resides between IP cloud 470 and Boundary Element 462 of first IP cloud 464. Similarly, second boundary point 492 resides between IP cloud 470 and Boundary Element 474 of second IP cloud 478.

The broad overview arrangement in FIG. 8 can be used to further describe the various WAN-LAN routing impediment scenarios outlined previously with respect to FIGS. 4-7.

For example, returning to a IP network arrangement 200 illustrated in FIG. 4, this arrangement comprises exclusively WAN-based PSTN Gateways. That is, in arrangement 200, there are no LAN based Enterprise PSTN Gateways. Therefore, with respect to FIG. 4, a failure zone, the first functional zone, and the second functional zones will all be contained within a WAN. Therefore, in the case of IP network 200 illustrated in FIG. 4, a failure zone will be contained in WAN 12.

Returning to FIG. 5, FIG. 5 illustrates an IP network arrangement 300 comprising exclusively LAN-based PSTN Gateways. That is, LAN 302 and LAN 304 comprise an Enterprise PSTN Gateway. In such an arrangement comprising exclusively LAN-based PSTN Gateways with a LAN-WAN link failure in one of the LANs, each LAN 302, 304 will comprise a functional zone. WAN 12 comprises a failure zone. The failed WAN-LAN link 330 will comprise a failure point and a LAN-WAN boundary of each LAN will comprise a LAN failure boundary. Therefore, with respect to an exclusive LAN-based PSTN Gateways configuration as illustrated FIG. 5, LAN-WAN link failure 306 occurring in LAN-WAN link 330 results in each LAN 302, 304 being defined as a functional zone. WAN 12 will comprise a failure zone. The failed LAN-WAN link 330 will be the failure point and a LAN-WAN boundary of each LAN 302, 304 comprise that LAN's failure boundary.

Notice that in this case, that LAN 304 that is not experiencing a LAN-WAN link failure may still have broad, useful access to WAN 12. That is, only traffic to or from LAN 302 with the failed WAN-LAN link 330 is affected. Therefore, in FIG. 5, LAN 304 without a LAN-WAN link failure may still have broad, useful access to WAN 12. It is only traffic to or from LAN 302 with failed link 330 that is affected.

On the other hand, LAN 302 with failed LAN-WAN link 330 may have no access to WAN 12. That is, symmetry of functional zones with respect to the failure point is not a requirement. If both LAN 302 and 304 experience a LAN-WAN link failure, then there are two failure points, each failure point adjacent to each failure boundary.

For a case of mixed WAN-based and LAN-based PSTN Gateways, a LAN will comprise one functional zone and the WAN will comprise the other functional zone. The failure zone will be in the WAN. Such arrangements are illustrated in FIGS. 6 and 7.

Generic PSTN Fallback Routing

Based in part on the above discussion, a system and method for PSTN fallback routing should have certain requirements. First, a system and method for PSTN fallback routing should have an ability of some network element in a functional zone to detect or determine the presence of a failure point, and to identify a failure zone. This is generally equivalent to being able to monitor, from within a functional zone, the IP network status of routes between boundary elements in each pair of functional zones. Note that an alternative to the complete lack of an IP route between boundary elements is the determination (by either side) that available routes are, for one reason or another, inferior to a PSTN fallback route as to make PSTN fallback routing a preferable choice over potential IP routes.

A system and method for PSTN fallback routing should also have the ability to complete a call between IP client devices that reside in different functional zones by utilizing PSTN Gateways that are associated with the different functional zones. That is, the system and method for PSTN fallback routing should establish a PSTN route between the respective PSTN Gateways. A Call Processing Server in each functional zone should be able to discover an availability of a route between their respective functional zones that uses their respective PSTN Gateways.

A method for meeting the first requirement could be passive detection of a route failure by a Call Processing Server at a time when a new call is signaled. For example, if a call signaling protocol includes a timeout for an absent response to some message or messages during call setup, then such a timeout may be utilized to identify a route failure. Alternatively, the first requirement could be met by an active detection of a route failure based upon one or more protocols used specifically to discover such failures as part of a network monitoring process.

A system based on a passive detection method could include a Call Processing Server at an originating end of an IP telephone call or an IP telephony session. During the process of call or session setup, the Call Processing Server may send a signaling message to a terminating end. If a failure exists, no response will be received for one or more messages from the originating Call Processing Server. The lack of a response(s) may then be interpreted as a route failure. Once this failure has been detected, the originating Call Processing Server could then initiate a call via a PSTN Gateway to which it has access. As those of ordinary skill will recognize, other approaches could be used as well.

A system based on the active detection method could include a specific protocol on a Boundary Element for monitoring the state of its connections and routes to peer boundary elements in other functional zones. Such a monitoring method could rely on standard IP protocols, or new, proprietary protocols that operate between peer boundary elements. When a boundary element discovers a route failure, the boundary element could notify an associated call processing server. This call processing server could then route subsequent calls via a PSTN Gateway.

This approach enables the call processing server to pre-select a PSTN Gateway for new IP telephony calls that would otherwise require routing through the boundary element. Such a system and method could avoid delays associated with per-call discovery of route status. However, it would also require a protocol between the boundary element and the call processing server for communicating network status. This could be an existing, standard protocol, or a new, proprietary protocol.

A method for meeting the second requirement is the maintenance of multiple possible routes for IP telephony calls or sessions between IP phones or IP client devices in different functional zones. Included among the alternatives could be a PSTN-based route using known PSTN Gateways. When a call processing server is setting up a new IP telephony session, the call processing server can compare the alternative routes with the server having knowledge of network route availability. If the server knows or discovers that one or more preferred IP routes are not available due to a failure point, then the server can select the PSTN route if that alternative route exists. For example, if the call processing server consults a directory (or, alternatively, some type of location) server on a call-by-call basis for candidate routes, the call processing server could incorporate the intelligence to make an optimal route selection. Alternatively, the directory (or location) server could be made aware of network status, and pre-filter each route identification request so as to omit known failed routes. Protocols for this method include SIP for the call session setup, and RADIUS for the query to the directory (or location) server.

A system for meeting the second requirement could use a SIP Proxy as a call processing server, a directory server to maintain a database of candidate routes, and a boundary element to monitor network status. When a new call is initiated, the SIP Proxy could receive the setup request (i.e., a SIP INVITE message), then launch a query to the directory server. Once the directory server replies to this query, the SIP proxy could compare the possible routes with network status as reported by the boundary element. If any or all IP routes are unavailable, the SIP proxy could then route the call via the PSTN Gateway, assuming that such a route is a known, viable route.

PSTN Fallback Routing of Active Calls

PSTN fallback routing has been described for setting up new IP telephony calls or new IP telephony sessions. That is, an IP failure point is either known prior to new call setup, or the IP failure point is discovered during the course of new call setup. In the event that the IP failure occurs during the time that an IP call or session is active, under present systems, that call is dropped. The active call will be dropped unless there is some system and method in place to dynamically reroute the call via PSTN fallback. This rerouting should take place with sufficient rapidity so as to make call or session interruption either unnoticeable or operationally acceptable. There is, therefore, a general need for such a dynamic system.

In order to accomplish dynamic PSTN fallback routing of an active IP telephony session or call, three high-level requirements should be met. This is in addition to the two requirements discussed in the previous subsection. First, the method and apparatus should have an ability of some network element or elements in a functional zone to actively detect or determine the presence of a failure point, and to identify the failure zone. This corresponds to active network monitoring from within a functional zone. Preferably, the monitoring and updating of network status occurs sufficiently frequently so as to allow switchover actions to be invoked before an active call or session is dropped.

Second, a call processing server and the corresponding protocol(s) used by the system for call signaling, control, and management must support re-routing of an active session or call.

Third, the call processing server and/or the boundary element must be able to distinguish call setup signaling for PSTN fallback calls from call setup signaling for new calls.

The first requirement is actually the same as that for PSTN fallback of new calls, with the restriction that the detection or determination of a failure point must be active. That is, the appropriate network element(s) in the functional zone (e.g., call processing server) should detect the occurrence of a failure point as soon as a failure occurs, or shortly thereafter. That is, the method cannot rely on passive detection, for example failed call setup signaling, since it is difficult to ensure that such passive detection will ever take place during an active call. Such a responsive failure point detection allows action to be initiated by appropriate network elements while the session or call is still active.

The ability to meet the second requirement generally ensures that the system and protocols are in fact capable of rerouting an active session or call when such rerouting is necessary. That is, after a failure point is detected, the system should initiate a dynamic switchover to a PSTN route. The protocol used must define methods that may be used to reroute active calls.

The third requirement provides for expeditious processing of PSTN fallback calls. Expeditious processing of a PSTN feedback call will provide switching delay over the interrupted IP call to the PSTN to an acceptable level. It may also be needed to facilitate the call signaling protocol in the case where an existing call is replaced by a new call. This requirement could be met by maintaining appropriate state information for calls on the call signaling server and/or the boundary element. Other means of meeting this requirement, such as extending the call signaling protocol, are also possible.

Exemplary Arrangements

The following exemplary examples of a system and method of dynamic PSTN switchover of active IP telephony calls described below either include the assumption that some or all of the previously discussed requirements are met, or illustrate how they can be met. The first example includes generic network devices, and generic, pseudo-protocols to illustrate the system and method.

The alternative arrangement includes specific SIP devices, and uses SIP as the signaling protocol. It should be understood that these exemplary examples do not exhaust the possible examples of this system and method, and that others are possible. For example, in one alternative arrangement, H.323 could be used instead of, or in addition to, SIP.

In both arrangements, an IP telephony call between two IP Client Devices (such as IP telephony device) located in two different functional zones is active at the time that a failure occurs. The failure point appears in a failure zone that separates the two functional zones. The first and the second arrangements are described in terms of call flow diagrams. The call flow diagrams identify the network elements that comprise the system. The call flow diagrams also identify the messages that flow between the elements. Since the initial session or call is established prior to an occurrence of a failure point, the associated call setup is not shown in the figures or described in the text. However, those or ordinary skill in the art will recognize how such initial session and/or calls are established.

Because in the presently proposed method and apparatus, it is possible for either client device involved in a session or call to discover an active call failure, either client device may initiate dynamic switchover steps. That is, either client device of the on going call may begin to originate a PSTN fallback call to the other client device. However, the final switchover includes only one client device acting as originator of the new session and the other client device acting as a terminator of the new session. Therefore, in the case of two "head-on" originations, one or the other client device cancels its call origination actions.

Before presenting the generic and SIP-based call flows, two methods are described for mitigating "head-on" PSTN fallback call origination that can be used in either example. Those of ordinary skill in the art will recognize that alternative methods of avoiding such a "head on" fallback call origination could be used as well.

Mitigation of "Head-On" Call Originations

As explained above, dynamic switchover to a PSTN of an IP session or call that is interrupted by an IP failure point requires some form of active failure detection. Once the call signaling servers in each of the affected functional zones are alerted to a failure, one or both of the call signaling servers may begin the process of PSTN switchover. In the case where both call signaling servers initiate a PSTN fallback call, one of the call setup procedures must be canceled while the other call setup procedure is allowed to be completed.

Alternative methods for mitigation of such "head-on" call setups may be used. However, these various methods require a call processing server to maintain certain information associated with existing, active calls for which the call processing server is the registrar for either the originating or terminating IP client device. For example, in one arrangement, a call processing server maintains information relating to an IP Client Device Identification ("ID"). The IP Client Device ID may comprise, e.g., an IP address of the Client Device. The Client Device is registered with the call processing server; it is in the same functional zone as the call processing server.

Other information that the call processing server maintains could include originating or terminating information of the client device. Such originating or terminating information could be used to identify the client device that is registered with the call processing server as either an originating device or as a terminating device of the existing call. In addition, the call server could maintain information relating to certain boundary element information. For example, certain boundary element information may be used to identify the boundary element, as well as any specific connection information relating to that boundary element, that is used for the existing call. For example, such specific connection information could include any or all of interface, IP address, port number, or VPN tunnel termination information. Other connection information could also be included. This information could be used to help monitor the status of the boundary element's connections, and thus be useful to the call processing server for routing decisions.

As just one example, if a system uses SIP, then the call processing server would comprise a SIP proxy, and an IP phone would comprise a SIP phone. Within a functional zone, the SIP phone would register with the SIP proxy using the SIP REGISTER method. Note that the above information pertains to existing, active calls; i.e., calls that include those which are interrupted by a failure point, and which would then be preserved or recovered by PSTN fallback routing.

Predetermined Originator

In one method for avoiding a head-on call set up, a call processing server initiates a process of setting up a PSTN fallback call if the associated IP Client Device was an originator of the original, interrupted IP call. In an alternative method, a call processing server initiates a process if the IP client device was the terminator of the original call. In either case, the call processing server has the necessary information to make this determination without requiring communication with its peer call processing server in the other functional zone. This method provides that only one side will initiate the fallback call. Consequently, there will be no "head-on" origination between the two IP client devices.

Discovered Call Duplication

In a first alternative method of avoiding a "head-on" origination of set up procedures, both call processing servers begin the process of setting up the PSTN fallback call when the two servers become aware of the failure point occurrence. During the call set up process, both call signaling processors discover that their call setup is duplicating the call setup procedure of the other call signaling processor. At this point, the call processing server whose registered IP client device terminated the original IP call cancels the PSTN fallback call setup process that it initiated. The other server takes no action other than those actions required to complete the call setup that the server initiated.

Similar to the method of predetermination, the roles of canceling server and setup server may be reversed, so long as only one call is setup. Again, the call processing server would have the necessary information to make this determination without requiring any communication with its call processing server peer in the other functional zone. In this case, two call setups are initiated, while one of the call setups is canceled, the other call setup is completed.

In both of the arrangements described below in FIGS. 9 and 10, for a dynamic switchover of an IP call to a PSTN it is assumed that the method of determining the predetermined originator has been used. However, as will be apparent to those of ordinary skill in the relevant art, the method of discovered call duplication could be used in either example, with relatively minor changes to the call flows.

Figure 9:
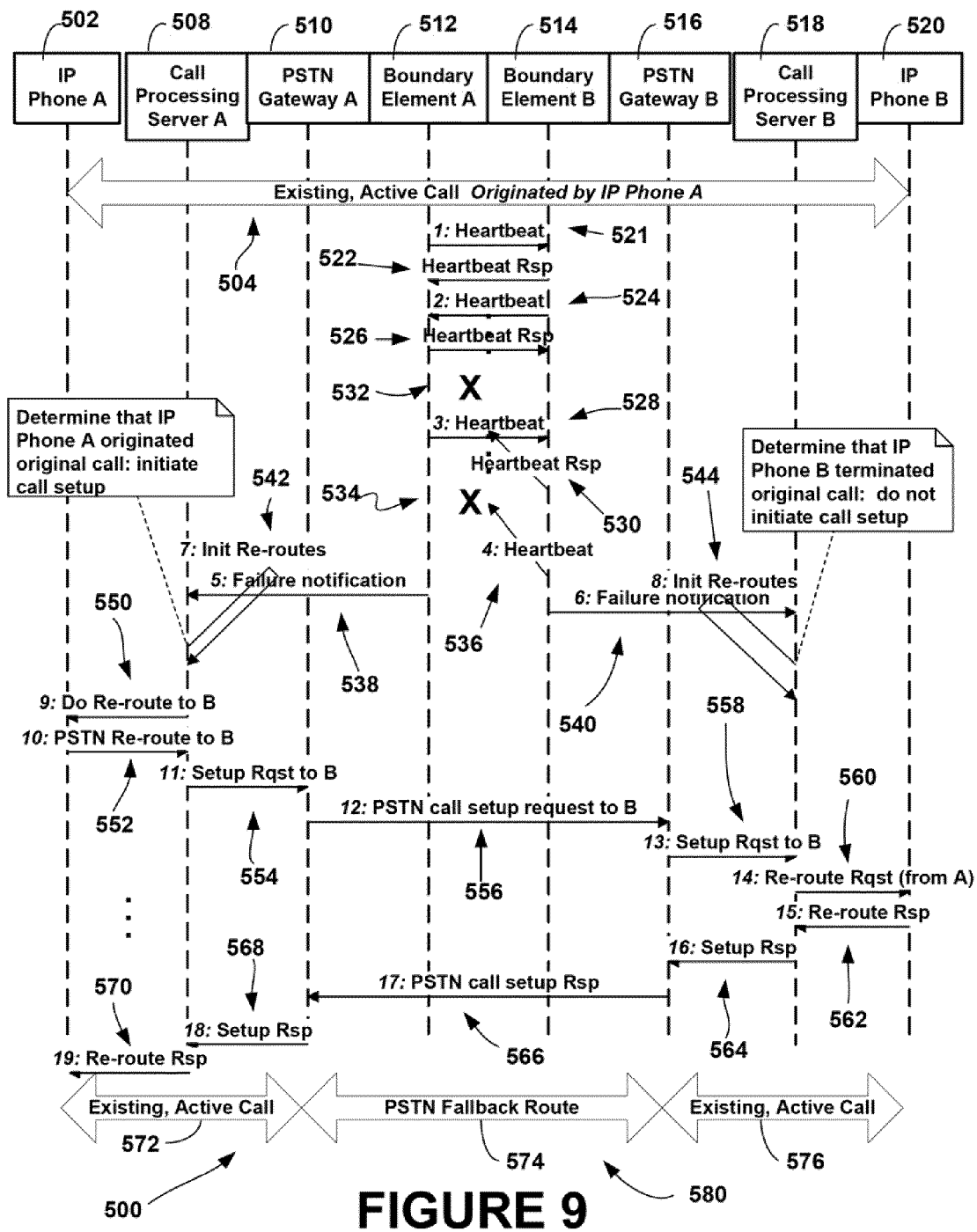
FIG. 9 illustrates a call flow for a first arrangement for a dynamic switchover of an IP call to the PSTN.

FIG. 9 illustrates a call flow 500 for a first arrangement for a dynamic switchover of an IP call to the PSTN. The network elements involved in the call flow 500 include IP Client A 502, Call Processing Server A 508, PSTN Gateway A 520, Boundary Element A 512, Boundary Element B 514, PSTN Gateway B 516, Call Processing Server B 518, and IP Client B 506. In this arrangement, both IP Client A 502 and IP Client B 506 comprise IP phones.

In this arrangement, an existing IP telephony session or call between a first IP Phone A 502 and a second IP Phone B 506 is ongoing. This existing, active IP telephony session 504, in this arrangement, is assumed to have originated by IP Phone A 502. In an alternative arrangement, IP Phone B 506 could have originated IP call 504. As those of ordinarily skill will recognize, PSTN Gateway A 510 and PSTN Gateway B 516 in this arrangement perform the required translation between the IP-based signaling and the PSTN (e.g., PRI) signaling.

Referring now to FIG. 9, at Steps 1 and 2, Boundary Elements 512, and 514 monitor a network parameter of the existing, ongoing IP telephony session 504. For example, at Step 1, Boundary Element A 512 sends a Heartbeat Request 521 to its peer, Boundary Element B 514. Boundary Element B 514 responds to Heartbeat Request 521 by transmitting a Heartbeat Response 522. In this arrangement, the exchange between the two Boundary Elements 512, and 514 of Heartbeat Request 521 and Response 522 represents a pseudo protocol for monitoring a network parameter between Boundary Element peers.

In a similar manner, at Step 2, Boundary Element B 514 sends a Heartbeat Request 524 to its peer Boundary Element A 512. Boundary Element A 512 responds to Boundary Element B by transmitting a Heartbeat Response 526. After Boundary Element B receives Heartbeat Response 526, the network experiences a routing impediment 532.

At Step 3, Boundary Element A 512 attempts to re-send a Heartbeat Request 528 to Boundary Element B 514. However, Boundary Element B's Response 530 is blocked by an IP failure or routing impediment 532.

At Step 4, Boundary Element B 514 attempts to send a Heartbeat Request 536 to Boundary Element A 512, except that Boundary Element B sends Request 534 does not reach Boundary Element A 512. Therefore, the lack of response seen at Boundary Element B 514 is because Boundary Element A 512 does not generate a response.

At Step 5, Boundary Element A 512 sends a Failure Notification 538 to Call Processing Server A 508. Similarly, at Step 6, Boundary Element B 514 sends a Failure Notification 540 to Call Processing Server B 518. In this arrangement, Failure Notification 540 from Boundary Element 514 to Call Processing Server B 518 occurs slightly after Failure Notification 538 is transmitted from Boundary Element A 512 to Call Processing Server A 508 in Step 5. Alternatively, Failure Notification 540 from Boundary Element 514 to Call Processing Server B 518 occurs slightly before Failure Notification 538 is transmitted from Boundary Element A 512 to Call Processing Server A 508 in Step 5.

At Step 7, Call Processing Server A 508 initiates a switchover action 542. Call Processing Server A 508 determines that IP Phone A 502 was an originator of IP call 504 that has now been interrupted. Preferably, Call Processing Server A 508 uses a predetermined originator method to determine that IP Phone A 502 was an originator of IP call 504 that has now been interrupted. Therefore, Call Processing Server A 508 continues to proceed with initiating setup of a PSTN fallback call.

At Step 8, Call Processing Server B 518 initiates a re-route or a switchover action 544. Similar to Call Processing Server A 508, Call Processing Server B 518 determines that IP Phone B 508 was a terminator of IP call 504 that has now been interrupted. Preferably, Call Processing Server B 518 uses the predetermined originator method to determine that IP Phone B 508 was a terminator of IP call 504 that has now been interrupted. Therefore, Call Processing Server B 518 does not continue with setup of the PSTN fallback call.

At Step 9, Call Processing Server A 508 provides an instruction 550 to IP Phone A 502 to initiate call reroute actions. Depending on the specific call signaling protocol, IP phone 502 could be informed of a special nature of a new call; i.e., a fallback for the current, interrupted call. Also included in the call initiation action could be an audio announcement to IP phone A 502 alerting a user of IP Phone A 502 that failed-call recovery or re-routing actions have been initiated. For example, such an announcement could comprise the statement: "We're sorry, your call has been temporarily interrupted. Please wait while we reconnect your call." Note that the exemplary flow example illustrated in FIG. 9 does not include a similar announcement for IP Phone B 506. However, in an alternative arrangement, such an announcement could be sent by Call Processing Server B 518 as a follow-up to the re-route initiation 544 at Step 8.

At Step 10, IP Phone A 502 initiates rerouting actions 552. IP Phone A 502 sends a call setup request message 552 to Call Processing Server A 508.

At Step 11, Call Processing Server A 508 sends a Setup Message Request 554 to PSTN Gateway A 510. This setup message 554 requests a PSTN call to IP Phone B 506 via PSTN. Prior to sending the request to PSTN Gateway A 510, Call Processing Server A 508 may have carried out a directory/location action to determine an appropriate PSTN gateway for call reroute. A directory/location action may also determine other PSTN routing information. For example, such other PSTN routing information could include information relating to the best terminating gateway for the call, in the event that more than one candidate is available.

At Step 12, PSTN Gateway A 510 initiates a call setup request 556 to its peer, PSTN Gateway B 516. As part of this initiation process, PSTN Gateway A 510 translates the IP-based signaling to PSTN signaling. At Step 13, PSTN Gateway B 516 receives the call setup request 556 from A, and sends an IP Based Setup Request 558 to Call Processing Server B 518. As part of this process, PSTN Gateway B 516 translates the PSTN signaling to IP-based signaling.

At Step 14, Call Processing Server B 518 sends an IP Call Setup Request 560 to IP Phone B 506. Call Processing Server B 518 recognizes Re-route Request 560 as a PSTN switchover, and informs IP Phone B 506 of this in a forwarded message. At Step 15, IP Phone B 506 gets the Call Setup Request 560 that was initiated by IP Phone A 502. IP Phone B 506 also recognizes re-rout request as a request to replace the previous existing, active call 504 with IP Phone A 502. IP Phone B 520 sends a Re-Route Response 562 back to Call Processing Server B 518.

At Step 16, Call Processing Server B 518 sends a Call Setup Response 564 to PSTN Gateway B 516. At Step 17, PSTN Gateway B 516 sends a Call Setup Response 566 to PSTN Gateway A 510. As part of this process, PSTN Gateway B 516 translates the IP-based signaling to PSTN signaling.

At Step 18, PSTN Gateway A 510 sends a Call Setup Response 568 to Call Processing Server A 508. As part of this call setup process, PSTN Gateway A 510 translates the PSTN signaling to IP-based signaling. At Step 19, Call Processing Server A 508 sends a Call Setup Response 570 to IP Phone A 502. At this point, the previous existing call 504 has now been rerouted through PSTN Gateway A and PSTN Gateway B.

The new call 580 now comprises two existing active call portions 572 and 576 along with a PSTN fall back route portion 574.

SIP-Based Method and System

Figure 10:
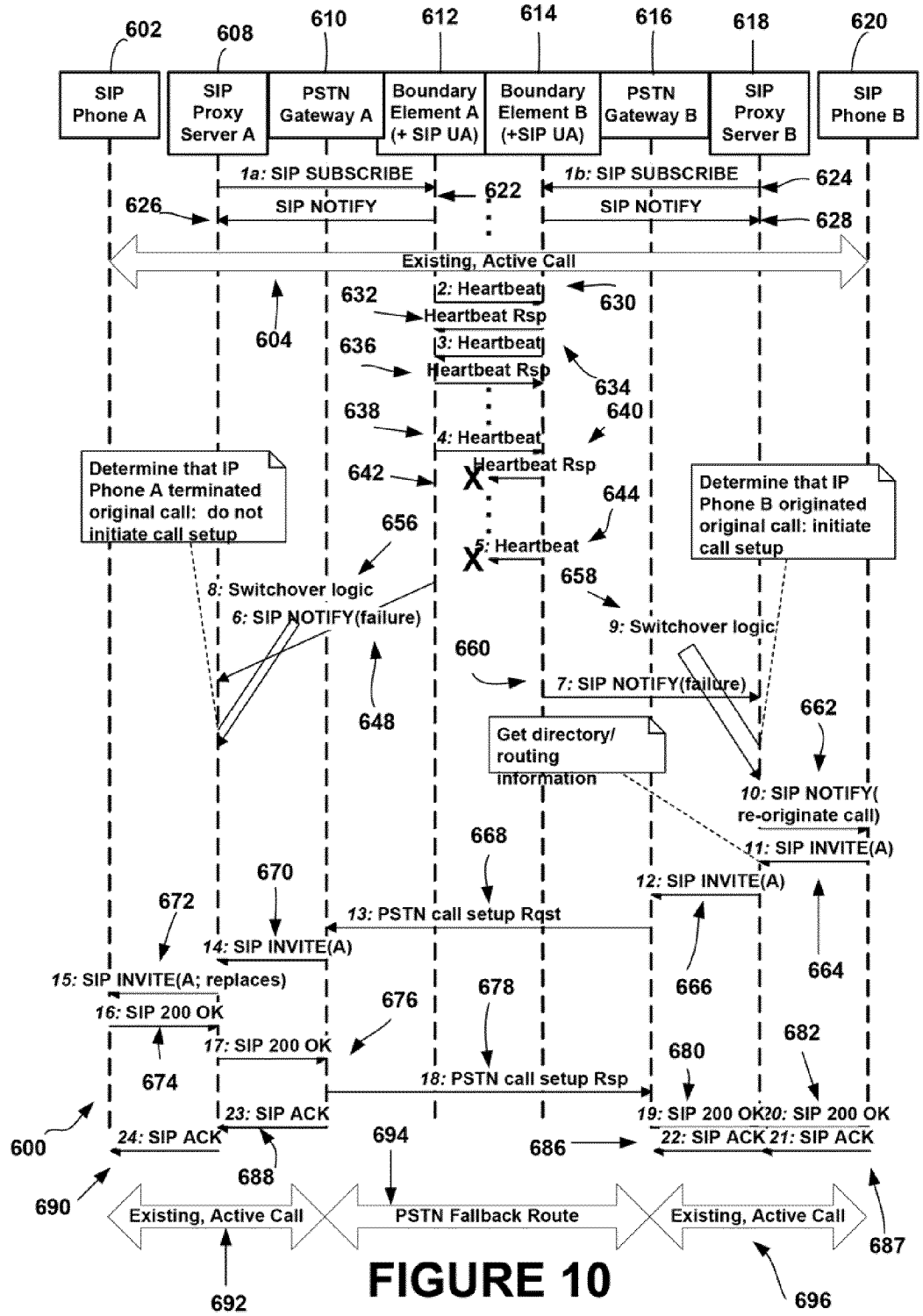
FIG. 10 illustrates a first alternative call flow for a first arrangement for a dynamic switchover of an IP call to the PSTN.

FIG. 10 illustrates an alternative call flow diagram 600 for a SIP-based example. Again, an active call 604 has been set up prior to the events and steps that comprise this call flow. The network elements involved in call flow 600 include a first SIP Phone A 602, a SIP Proxy Server A 608, a PSTN Gateway A 610, a Boundary Element A (+ SIP UA) 612, a Boundary Element B (+ SIP UA), a PSTN Gateway 616, a SIP Proxy Server B 618, and a second SIP Phone B 620. In this example, IP Phone B 620 originated IP call 604 to IP Phone A 602.

The steps and messages in call flow 600 are described in the following discussion, where enumeration in the list corresponds to the numbered messages in the call flow. Note that the use of SIP NOTIFY and SUBSCRIBE methods between the SIP proxy servers and their respective boundary elements is made possible by the inclusion of a SIP User Agent (UA) in each boundary element. Use of a SIP UA in the boundary element for general SIP communications with the SIP proxy server, or other SIP-enabled devices in the network, is a feature of this example. Also, the PSTN Gateways in this arrangement include SIP capabilities. Specifically, the PSTN Gateways can translate between SIP signaling and PSTN (e.g., PRI) signaling.

At Step 1a, initialization of SIP communications between SIP proxy servers and their respective boundary elements occurs. The SIP UA in each boundary element is assumed to have registered with its respective SIP proxy server. This registration step is omitted in FIG. 10. SIP SUBSCRIBE by SIP Proxy Server A 608 to a user agent in Boundary Element A 612 for network status events detected by Boundary Element A 612. This tells Boundary Element A 612 to notify SIP Proxy Server A 608 of certain network events that can impact calls. In particular, Boundary Element A 612 will notify Proxy Server A 608 if and when an IP failure point occurs. Boundary Element A 612 responds to initial SIP SUBSCRIBE 622 with a SIP NOTIFY 626 to confirm the subscription.

At Step 1b, similar to Step 1a, initialization of SIP communications between SIP proxy Server B and its respective boundary elements occurs. SIP SUBSCRIBE message sent by SIP Proxy Server B 624 to a user agent in Boundary Element B 614 for network status events detected by Boundary Element B 614. This instructs Boundary Element B 614 to notify SIP Proxy Server B 618 of certain network events that may impact calls. In particular, Boundary Element B 614 will notify SIP Proxy Server B 618 if and when an IP routing impediment occurs. Boundary Element B 614 responds to initial SIP SUBSCRIBE 624 with a SIP NOTIFY 628 to thereby confirm the subscription.

At Step 2, Boundary Element A 612 sends a Heartbeat Request 630 to its peer, Boundary Element B 614. In return, Boundary Element B 614 sends a Heartbeat Response 632 to Boundary Element A 612.

At Step 3, Boundary Element B 614 sends a Heartbeat Request 634 to its peer, Boundary Element A 612. In return, Boundary Element A 612 sends a Heartbeat Response 636 to Boundary Element B 614. This exchange of Heartbeat messages represents a pseudo protocol for health monitoring between peers.

At Step 4, Boundary Element A 612 sends a Heartbeat Request 638 to Boundary Element B 614. However, after Heartbeat Response 636 is received by Boundary Element B 614, the system experiences a routing impediment 642.

Therefore, Boundary Element B's Heartbeat Response 640 is blocked by a routing impediment 642.

At Step 5, Boundary Element B 614 sends a Heartbeat Request 644 but this Request 644 does not reach Boundary Element A 612. Therefore, the lack of response seen at Boundary Element B 614 arises because Boundary Element A 612 does not generate a response.

At Step 6, Boundary Element A 612 notifies SIP Proxy Server A 608 of IP failure 642. Preferably, Boundary Element A 612 notifies SIP Proxy Server A 608 of IP failure 642 by sending a SIP NOTIFY message 648.

At Step 7, Boundary Element B 614 notifies SIP Proxy Server B 618 of IP failure 642. Preferably, Boundary Element B 614 notifies SIP Proxy Server B 618 of IP failure 642 by sending a SIP NOTIFY message 660. This notification occurs slightly after the A-side notification in Step (6). However, the timing of these respective notifications may at different times.

At Step 8, SIP Proxy Server A 608 initiates call switchover logic 656. SIP Proxy Server A 608 determines that IP Phone A 602 was the terminator of the interrupted IP call 604. Preferably, SIP Proxy Server A 608 uses the predetermined originator method to determine that IP Phone A 602 was the terminator of the interrupted IP call. Therefore, SIP Proxy Server A 608 does not continue with setup of the PSTN fallback call.

At Step 9, SIP Proxy Server B 618 initiates switchover actions 658. SIP Proxy Server B 618 determines that IP Phone B 620 was an originator of the interrupted IP call. Preferably, SIP Proxy Server B 618 uses the predetermined originator method to determine that IP Phone B 620 was an originator of the interrupted IP call. Therefore, SIP Proxy Server B 618 continues to proceed with setup of the PSTN fallback call.

At Step 10, SIP Proxy Server B 618 provides instructions 662 to SIP Phone B 620 to initiate reroute actions. Preferably, this is done by instructing SIP Phone B 620 to re-originate the call to SIP Phone A 602. Such a re-origination action would be an extension to the SIP protocol. In this example, SIP Proxy Server B 618 sends these instructions to SIP Phone B 620 using a SIP NOTIFY message 622. Note that this presumes that SIP Phone B 620 previously issued a SIP SUBSCRIBE message 624 to SIP Proxy Server B 614 in order to receive notifications, including ones with a re-originate instruction. For call 604, this previous SIP SUBSCRIBE message 622 takes place at Step 1b.

Also included in this action could be an audio announcement to SIP Phone B 620 alerting a user of the SIP Phone that failed-call recovery actions are underway. Such an alert could comprise the statement: "We're sorry, your call has been temporarily interrupted. Please wait while we reconnect your call." Although call flow 600 does not include a similar message to IP Phone A 602, such a message could be sent by SIP Proxy Server A 608 as a follow-on to the switch over logic message 656 that occurs at Step 8.

At Step 11, SIP Phone B 620 initiates re-origination by sending a SIP INVITE 664 to SIP Phone A 602. SIP Phone B 620 forwards SIP INVITE 664 to SIP Proxy Server B 618. At Step 12, SIP Proxy Server B 618 sends a SIP INVITE (A) message 666 to PSTN Gateway B 616. This SIP INVITE (A) message 666 requests a PSTN call to IP Phone A 602 via the PSTN. Prior to sending this request to PSTN Gateway B 616, SIP Proxy Server B 618 may carry out a directory/location action to determine an appropriate gateway, and other PSTN routing information. Preferably, SIP INVITE 666 contains contact information for PSTN Gateway A 610, as well as for SIP Phone A 602.

At Step 13, PSTN Gateway B 616 initiates a Call Setup Request 668 to its peer, PSTN Gateway A 610. PSTN Gateway B 616 translates SIP INVITE 666 to an appropriate PSTN setup message. At Step 14, PSTN Gateway A 610 receives Call Setup Request 668 from PSTN Gateway B 616 and translates the PSTN setup messages to a SIP INVITE 670 to IP Phone A 602. The SIP INVITE 670 is then sent to SIP Proxy Server A 608.

At Step 15, SIP Proxy Server A 608 sends SIP INVITE (A; replaces) 672 to SIP Phone A 602. SIP Proxy Server A 608 recognizes the request as a PSTN switchover. Preferably, SIP Proxy Server then adds a "replaces" header in the SIP INVITE 672. This instructs SIP Phone A 602 to replace the current (interrupted) call 604 with a new call 690.

At Step 16, SIP Phone A 602 gets SIP INVITE 672 that was initiated by SIP Phone B 620, and replaces its current call. SIP Phone A 602 then responds by transmitting back a SIP 200 OK message 674. This message 674 is sent to SIP Proxy Server A 608. At Step 17, SIP Proxy Server A 608 sends SIP 200 OK 676 to PSTN Gateway A 610. PSTN Gateway A 610 translates SIP 200 OK 676 into a PSTN setup response message.

At Step 18, PSTN Gateway A 610 sends PSTN setup response 678 to PSTN Gateway B 616. At Step 19, PSTN Gateway B 616 translates PSNT setup response message 678 into a SIP 200 OK message 680. SIP 200 OK message 680 is then sent to SIP Proxy Server B 618.

At Step 20, SIP Proxy Server B 618 sends SIP 200 OK message 682 to IP Phone B 620. At Step 21, SIP Phone B 620 responds with a SIP ACK 682 which is then send to SIP Proxy Server B 618. At Step 22, SIP Proxy Server B 618 sends SIP ACK 680 to PSTN Gateway B 616. At Step 23, PSTN Gateway A 610, in response to SIP 200 OK 676 it received in Step 17, generates a SIP ACK 688, and sends SIP ACK 688 to SIP Proxy Server A 608.

At Step 24, SIP Proxy Server A 608 sends SIP ACK 690 to SIP Phone A 602, which consumes it. At this point, previously existing call 604 has now been rerouted through PSTN Gateway A 610 and PSTN Gateway B 616. The new call 690 now comprises two existing active call portions 692 and 697 along with a PSTN fall back route portion 594.

In the call flow arrangement illustrated in FIG. 10, the SIP acknowledgment ("ACK") messages are not connected by PSTN messages. That is, the SIP phones do not actually communicate the ACKs end-to-end. However, in alternative arrangements, end-to-end ACKs could be utilized.

Exemplary Arrangements of Network Topologies

A. IP-PBX LANs

Figure 11:
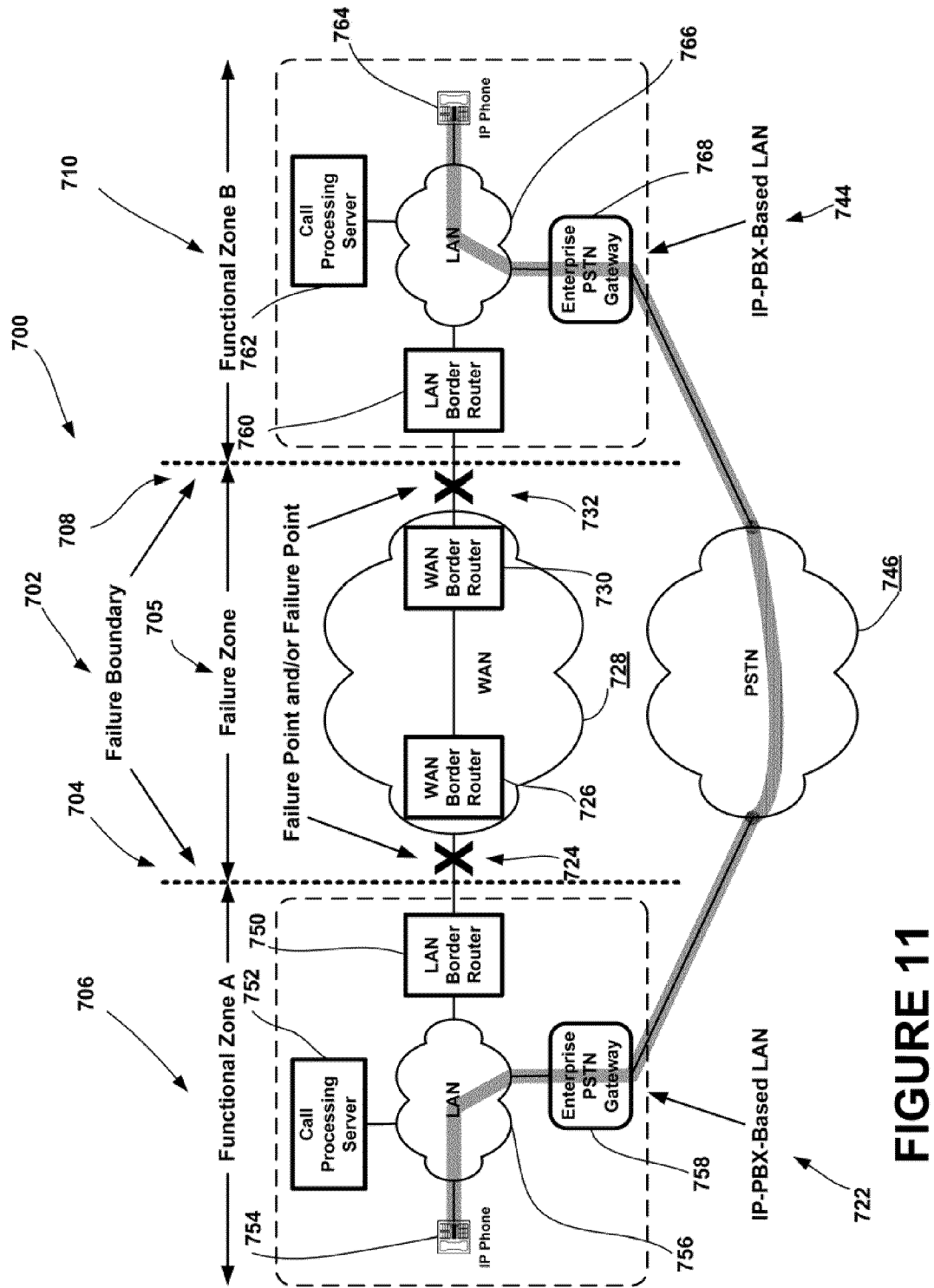
FIG. 11 illustrates an alternative configuration for routing a call through PSTN in the event of a LAN-WAN routing impediment.

FIG. 11 illustrates an alternative arrangement for routing a call through PSTN in the event of a LAN-WAN routing impediment. FIG. 11 illustrates an IP-PBX LAN network topology 700 using the various functional definitions previously provided. Network topology 700 comprises a first Functional Zone A 706, a second Functional Zone 710, and a Failure Zone 705. Failure Zone 705 is essentially defined by a Failure Boundary 702. The first Functional Zone A 706 comprises a Call Processing Server 714, a LAN Border Router 716, an IP Phone 712, a LAN 718, and an Enterprise PSTN Gateway 720. Similarly, the second Functional Zone B 710 comprises a Call Processing Server 736, a LAN Border Router 734, an IP Phone 738, a LAN 740, and an Enterprise PSTN Gateway 742. Failure Boundary 702 extends from a first Failure Boundary 704 to a second Failure Boundary 708.

In network arrangement 700, IP-PBX-Base LANs 722 and 744 represent the functional zones 706, 710. Failure Zone 705 is represented by an interconnecting WAN 728. A failure point can occur at one or both of the respective LAN-WAN boundaries. For example, failure point 724 could occur between WAN Border Router 726 and LAN Border Router 716. Similarly, Failure Point 732 could occur between WAN Border Router 730 and LAN Border Router 734. Once either Failure Point 724 or 732 is detected, an active call 748 would be rerouted from IP Phone 754 via PSTN 746 to IP Phone 764 using both Enterprise PSTN Gateways 720 and 742. In FIG. 11, the specific network elements may be defined according to either the generic description of the system and method, or the SIP-based description.

B. IP-Centrex LANs

Figure 12:
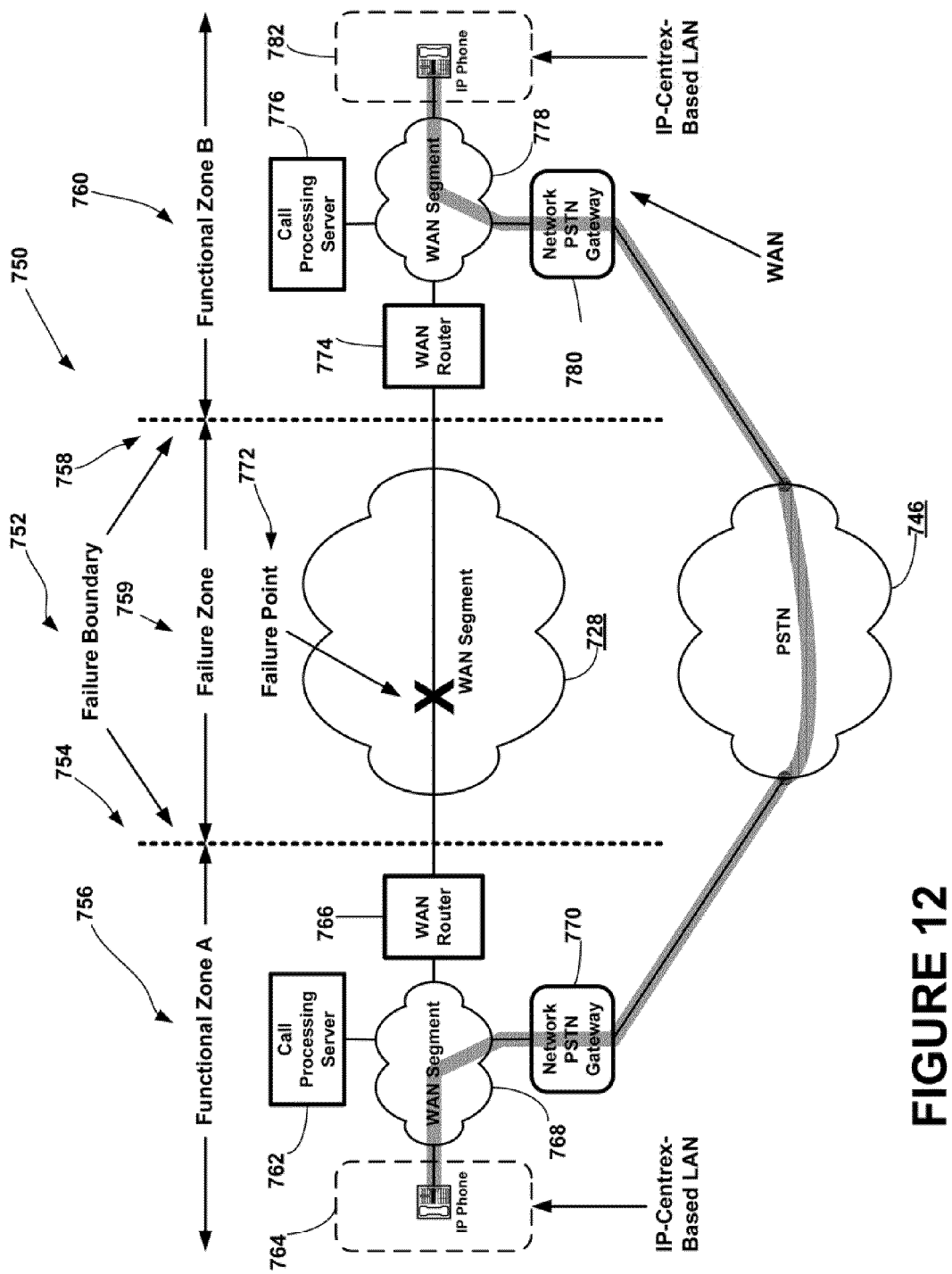
FIG. 12 illustrates another alternative arrangement for routing a call through PSTN in the event of a LAN-WAN routing impediment.

FIG. 12 illustrates another alternative arrangement for routing a call through PSTN in the event of a LAN-WAN routing impediment. FIG. 12 illustrates an IP-Centrex LAN network topology 750. In this arrangement, each functional zone comprises a LAN along with a portion of a WAN. The WAN comprises a call processing server, an appropriate boundary element, a network PSTN gateway, and, other network elements that support IP telephony in the WAN.

For example, as illustrated in FIG. 12, network arrangement 750 comprises Functional Zone A 756, Functional Zone B 760, and Failure Zone 759. Failure Zone 759 is defined by Failure Boundary 752 and Failure Boundary 752 has a first and a second boundary 754 and 758, respectively. Failure Zone 759 comprises an interconnecting portion of WAN 728. Once Failure Point 772 in a WAN segment is detected, an active call would be rerouted. In this arrangement, an active call 790 is rerouted from an IP Phone residing in IP Centrex-Based LAN 764 via PSTN 746 to an IP Phone residing in IP-Centrex Based LAN 782. Call 790 is rerouted using both Network PSTN Gateway 770 of Functional Zone A 756 and Network PSTN Gateway 780 of Functional Zone B 760. In FIG. 12, the specific network elements are defined according to either the generic description of the system and method, or the SIP-based description.

C. Mixed IP-PBX and IP-Centrex LANs

Figure 13:
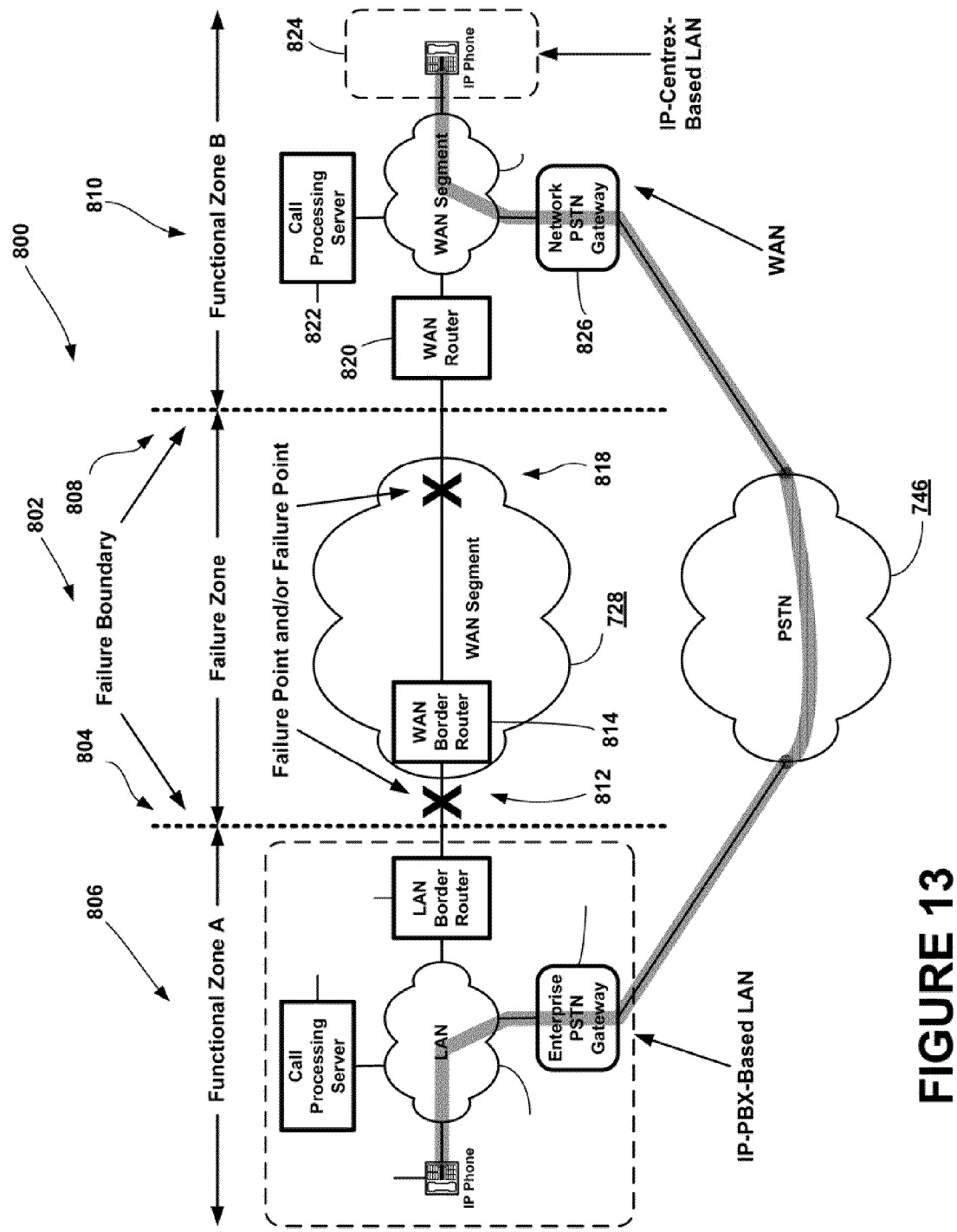
FIG. 13 illustrates yet another alternative configuration for routing a call through PSTN in the event of a LAN-WAN routing impediment.

FIG. 13 illustrates yet another alternative arrangement for routing a call through PSTN in the event of a LAN-WAN routing impediment. This network arrangement 800 one functional zone consists of the IP-Centrex-based LAN plus that portion of the WAN that contains the call processing server, appropriate boundary element, network PSTN gateway, and, any other network elements that support IP telephony in the WAN. The other functional zone consists of the IP-PBX-based LAN. The failure zone is the interconnecting portion of the WAN.

For example, the network arrangement 800 comprises Functional Zone A 806, Functional Zone B 810, and Failure Zone 802. Failure Zone 809 is defined by Failure Boundary 802 that has a first and a second boundary 804 and 808, respectively. Failure Zone 809 comprises an interconnecting WAN 728. WAN 728 can experience a failure point between a WAN Border Router 814 and a LAN Border Router. Alternatively, WAN 728 can experience a failure point internally to the WAN 728. Once either failure point 812 or failure point 818 is detected, an active call 840 would be rerouted from IP Phone residing at IP PBX-Based LAN 842 via PSTN 746 and via WAN 846 to an IP Phone located at IP-Centrex Based LAN 824. Call 840 will be rerouted using Enterprise PSTN Gateway 816 of Functional Zone A 806 and Network PSTN Gateway 826 of Functional Zone B 810. In FIG. 12, the specific network elements are defined according to either the generic description of the system and method, or the SIP-based description.

PSTN fallback routing of IP calls has been used previously for the setup of new calls, when theses calls are initiated subsequent to an IP failure. The present specification is generally directed to a method and apparatus using dynamic PSTN fallback routing for active calls which are setup prior to an IP failure, but are subject to that failure during the course of the call. Such dynamic PSTN fallback routing for active calls could be used in a variety of scenarios. For example, if a LAN-WAN link fails, existing active calls could be dynamically rerouted via PSTN fallback routing if an appropriately located PSTN gateway is available. Dynamic PSTN fallback routing could also be used if the LAN-WAN link becomes overly congested, or if existing voice calls need to be preempted by higher priority traffic. Other scenarios in which dynamic PSTN fallback routing could be used are possible.

Moreover, the examples described have addressed specifically IP telephony calls between functional zones which are separated by a failure zone. However, the system and method could apply to other types of IP-based sessions and connections between the two functional zones. For example, various types of IP multimedia sessions could be dynamically rerouted via the PSTN using the system and method described herein. Another arrangement could comprise a communications link between the respective call processing servers in each functional zone. If the ability to establish direct communication between the call processing servers in each of the functional zones separated by a failure zone is beneficial to operations and general IP communications between the functional zones, then PSTN fallback routing could be used to provide such a connection, in the event that the failure point(s) would otherwise impair or prevent those communications. Other uses of PSTN fallback routing are possible.

Various exemplary examples have been described above. Those skilled in the art will understand, however, that changes and modifications may be made to these examples without departing from the true scope and spirit of the present specification, which is defined by the claims.

What is claimed is:

1. A method for rerouting IP (Internet Protocol) telephony call information, said method comprising:
    during an active IP telephony call made by a first IP telephony phone for originating IP telephony calls over an IP network, with a boundary element, actively detecting a network failure condition in the IP network which indicates a switchover to a PSTN (Public Switched Telephone Network) network and generating a failure notification; and
    with a server for receiving the failure notification, generating a dynamic switchover instruction generated that is sent to the first IP telephony phone, the dynamic switchover instruction initiating automatic switchover of said active IP telephony call to a PSTN network.

2. The method of claim 1, further comprising using a Session Initiation Protocol (SIP) for call signaling in the IP telephony network.

3. The method of claim 1, wherein said first IP telephony phone comprises a Session Initiation Protocol phone.

4. The method of claim 1, further comprising using H.323 protocol call signaling in the IP telephony network.

5. The method of claim 1, further comprising, in response to said switchover instruction,
    establishing an IP telephony connection between said first IP telephony phone and a first PSTN gateway communicatively linked to said first IP telephony phone;
    establishing a PSTN connection from said first PSTN gateway to a second PSTN gateway; and
    establishing an IP telephony connection between said second PSTN gateway and said second IP telephony phone communicatively linked to said second gateway.

6. The method of claim 1, in which the dynamic switchover instruction comprises a notify signal to the first IP telephony phone, the method comprising, in response to the notify signal, initiating switchover logic in the first IP telephony phone.

7. The method of claim 1, wherein the network comprises a Session Initiation Protocol (SIP) proxy on the server and SIP user agents in each boundary element, the method comprising using SIP NOTIFY and SUBSCRIBE methods between the SIP proxy and boundary elements.

8. The method of claim 7, further comprising notifying the server of a network failure with a boundary element in communication with the SIP proxy by sending an SIP NOTIFY message to the SIP proxy from the boundary element.

9. The method of claim 1, further comprising using heartbeat messages comprising a protocol for health monitoring between peer elements.

10. The method of claim 1, in which the dynamic switchover instruction is generated by the server and sent to the first IP telephony phone, the first IP telephony phone generating a rerouted call which is connected through a PSTN network such that a call interruption is unnoticeable.

11. The method of claim 10, in which the dynamic switchover instruction is distinguishable from call setup signaling for new calls.

12. The method of claim 11, in which the dynamic switchover instruction is a Session Initiation Protocol (SIP) INVITE message, the method further comprising:
  with the server, adding a replaces header to the SIP INVITE message; and
  with the first IP telephony phone, replacing a current interrupted IP telephony call with a new call which is at least partially routed through the PSTN network.

13. A method for rerouting IP (Internet Protocol) telephony call information, said method comprising:
  with a server, monitoring an IP network for route failures; and
  with the server, generating a switchover instruction when an active IP telephony call is interrupted by a route failure,
  the switchover instruction initiating automatic switchover of the active IP telephony call to a fallback call routed through a Public Switched Telephone Network (PSTN), the switchover instruction including information which identifies the fallback call as a replacement for the active IP telephony call.

14. The method of claim 13, further comprising, with an originating phone for originating IP telephony calls over the IP network, receiving the switchover instruction and making the fallback call.

15. The method of claim 14, in which the server is a registrar for the originating phone and maintains IP client device identification and boundary element connection information for rapid rerouting decisions.

16. The method of claim 14, wherein the originating phone comprises a Session Initiation Protocol phone.

17. The method of claim 1, wherein the network comprises a Session Initiation Protocol (SIP) proxy on the server and SIP user agents in each of a plurality of boundary element, the method comprising using SIP NOTIFY and SUBSCRIBE methods between the SIP proxy and boundary elements.

18. The method of claim 17, further comprising notifying the server of a network failure with a boundary element in communication with the SIP proxy by sending an SIP NOTIFY message to the SIP proxy from the boundary element.

19. The method of claim 13, wherein said monitoring an IP network for route failures further comprises, with a first border element in communication with said server, monitoring the IP network through which the active IP telephony call is routed, the monitoring performed by said first border element comprising:
  a heartbeat request sent through the network by the first border element to a peer border element;
  a heartbeat response sent through the network by the peer border element to the first border element.

20. The method of claim 19, further comprising, with the first border element, sending a failure notification to the server when the monitoring reveals a route failure.

* * * * *